(12) United States Patent
Zheng et al.

(10) Patent No.: US 10,160,503 B1
(45) Date of Patent: Dec. 25, 2018

(54) ELECTRIC SKATEBOARD WITH MOTION ASSISTANT GRAVITY CONTROL

(71) Applicants: Hui Zheng, Irvine, CA (US); Deyi Pi, Irvine, CA (US); Bingqiang Zhu, Irvine, CA (US)

(72) Inventors: Hui Zheng, Irvine, CA (US); Deyi Pi, Irvine, CA (US); Bingqiang Zhu, Irvine, CA (US)

( * ) Notice: Subject to any disclaimer, the term of this patent is extended or adjusted under 35 U.S.C. 154(b) by 0 days.

(21) Appl. No.: 15/669,923

(22) Filed: Aug. 5, 2017

(51) Int. Cl.
*B62D 51/02* (2006.01)
*A63C 17/01* (2006.01)
*A63C 17/12* (2006.01)

(52) U.S. Cl.
CPC ............ *B62D 51/02* (2013.01); *A63C 17/013* (2013.01); *A63C 17/015* (2013.01); *A63C 17/017* (2013.01); *A63C 17/12* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 6,050,357 A * | 4/2000 | Staelin | ................. | A63C 17/004 |
| | | | | 180/181 |
| 9,393,483 B2 * | 7/2016 | Tan | ........................ | A63C 17/12 |
| 2010/0222941 A1 * | 9/2010 | Chang | .................. | A63C 17/015 |
| | | | | 701/2 |
| 2012/0232734 A1 * | 9/2012 | Pelletier | ................. | A63C 17/12 |
| | | | | 701/22 |
| 2013/0081891 A1 * | 4/2013 | Ulmen | .................... | A63C 17/12 |
| | | | | 180/181 |
| 2016/0059108 A1 * | 3/2016 | Demolder | ............... | A63C 17/12 |
| | | | | 701/22 |
| 2017/0007910 A1 * | 1/2017 | Ruschkowski | ......... | A63C 17/12 |
| 2017/0113122 A1 * | 4/2017 | Ji | ............................ | A63C 17/12 |
| 2017/0252638 A1 * | 9/2017 | Ulmen | .................... | A63C 17/12 |

* cited by examiner

*Primary Examiner* — Tyler D Paige

(57) ABSTRACT

An electric skateboard is disclosed. In one aspect, the electric skateboard comprises a foot placement section. The electric skateboard comprises a wheel suspension truck connected to the foot placement section. The electric skateboard comprises a first wheel and a second wheel, wherein the first wheel and the second wheel are spaced apart and substantially parallel to one another and wherein the first wheel and the second wheel are connected to the wheel suspension truck. The electric skateboard comprises a deformation sensor module attached to the wheel suspension truck, the deformation sensor module configured to generate a weight signal and a gravity angle signal associated with the electric skateboard. The electric skateboard comprises a control logic configured to output control signals that control a movement of the electric skateboard in response to the weight signals, and the gravity angle signals.

16 Claims, 23 Drawing Sheets

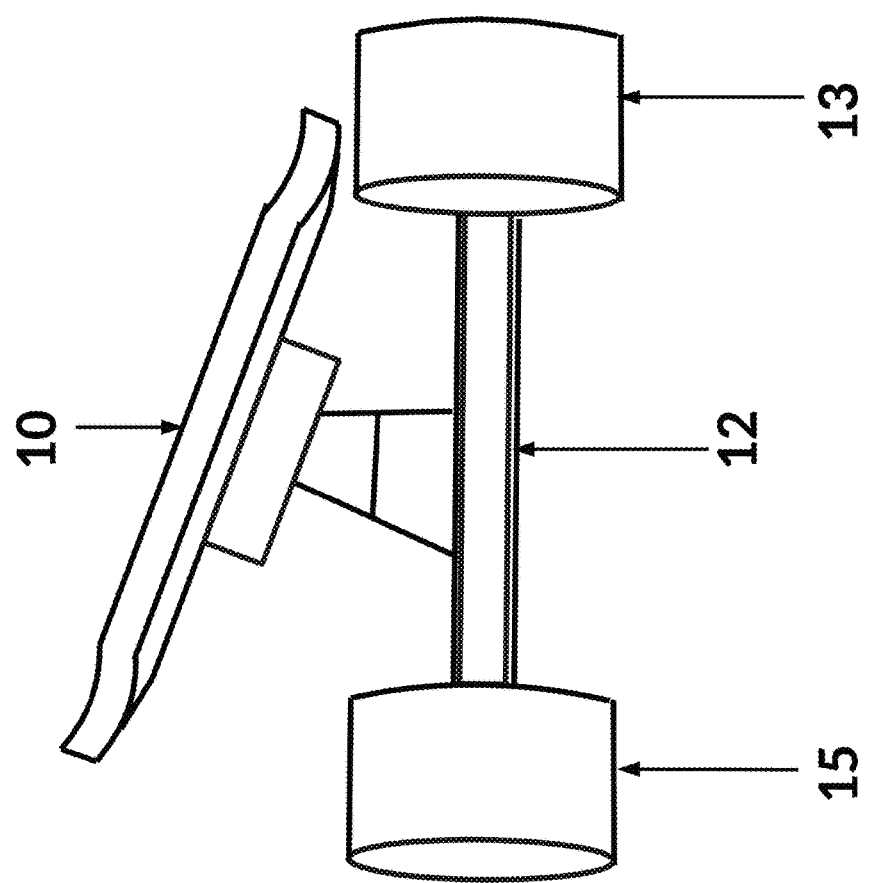

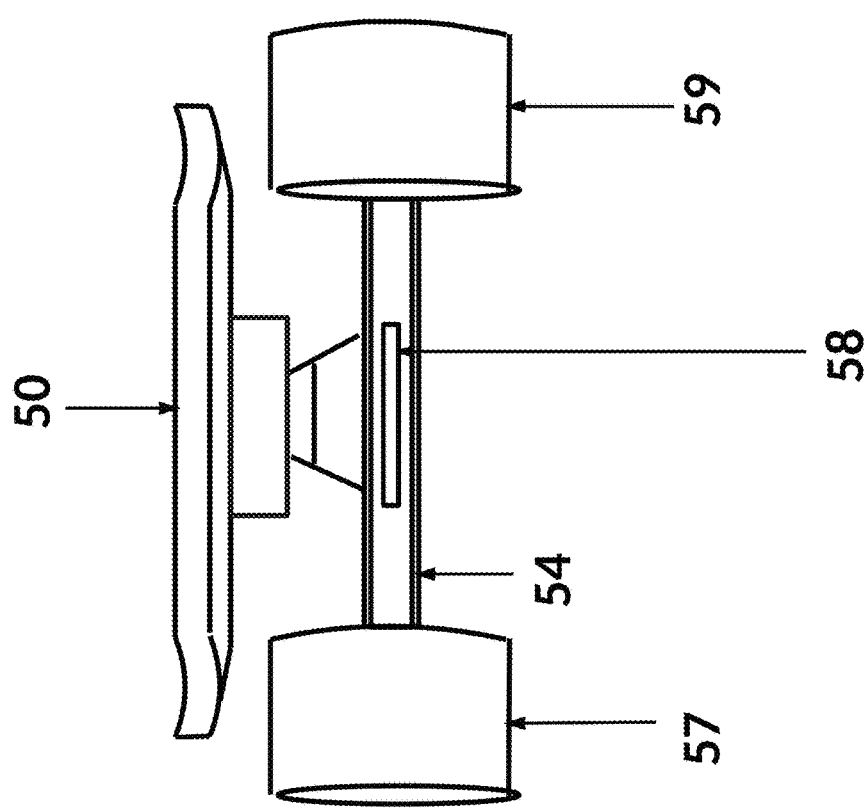

ELECTRIC SKATEBOARD WITH MOTION ASSISTANT GRAVITY CONTROL

TECHNICAL FIELD

The present disclosure relates to one or more electric skateboards and methods for controlling the one or more electric skateboards with motion assistant gravity control.

BACKGROUND

A skateboard is a type of sports equipment or toy used primarily for the activity of skateboarding. In some aspects, a skateboard may be moved by a rider by pushing with one foot while the other remains on the board, or by pumping one's legs in structures such as a bowl or half pipe. Recently, electric skateboards become more and more attractive. Electric skateboards may no longer require propelling of the skateboard by means of the feet; rather an electric motor propels the board, fed by an electric battery. In an electric skateboard, possibly one, two, three or four of the four wheels could be the driving wheels which are controlled by the control module and powered by battery. A Brushless DC motor (BLDC) is typically built into the driving wheels.

FIG. 1A illustrates a side view of a conventional electric skateboard 100. The electric skateboard 100 comprises a foot pad or foot board 10, a battery and control module 11, a wheel suspension truck 12, a wheel suspension truck 14, a wheel 13, a wheel 15, a wheel 17 and a wheel 19.

FIG. 1B illustrates a bottom view of the electric skateboard 100 shown in FIG. 1A. In some aspects, a remote control 18 may be associated with the electric skateboard.

FIG. 2A illustrates a front view of the electric skateboard 100 shown in FIG. 1A.

FIG. 2B illustrates a rear view of the electric skateboard 100 shown in FIG. 1A.

FIGS. 3A-3C illustrate a front view of the electric skateboard 100 shown in FIG. 1A when the electric skateboard 100 is steered to turn to left or right.

As shown in FIGS. 3A-3C, the electric skateboard 100 may be steered by a rider by shifting his or her weight to the right or left to complete a right turn or a left turn, or keep straight. As shown in FIG. 3A, the electric skateboard 100 may be steered by a rider by shifting his or her weight to the left to complete a left turn. As shown in FIG. 3B, the electric skateboard 100 may be kept straight by a rider by not shifting his or her weight substantially. As shown in FIG. 3C, the electric skateboard 100 may be steered by a rider by shifting his or her weight to the right to complete a right turn.

Conventionally, a remote control unit, such as a remote control 18 is needed as a control input device to an electric skateboard to set the moving direction to forward or backward, and control the electric skateboard to accelerate or brake.

FIG. 4 illustrates one example of a control diagram of the electric skateboard 100 shown in FIG. 1A. As shown in FIG. 4, a driving control module may receive control commands and signals from a remote control unit wirelessly. The driving control module may post-process the received commands and signals and send one or more motor signals to driving wheels to operate the electric skateboard.

However, it may be very inconvenient for the rider to hold the remote control device all the time when riding the electric skateboard.

SUMMARY

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

An electric skateboard is disclosed according to one embodiment of the present disclosure. In one aspect, the electric skateboard comprises a foot placement section. The electric skateboard comprises a wheel suspension truck connected to the foot placement section. The electric skateboard comprises a first wheel and a second wheel, wherein the first wheel and the second wheel are spaced apart and substantially parallel to one another and wherein the first wheel and the second wheel are connected to the wheel suspension truck. The electric skateboard comprises a deformation sensor module attached to the wheel suspension truck, the deformation sensor module configured to generate a weight signal and a gravity angle signal associated with the electric skateboard. The electric skateboard comprises a control logic configured to output control signals that control a movement of the electric skateboard in response to the weight signals, and the gravity angle signals.

In some embodiments, the electric skateboard further comprises an accelerometer sensor and a gyroscope sensor.

In some embodiments, the control logic is configured to output control signals that control the movement of the electric skateboard in response to the weight signals, the gravity angle signals, and output signals of the accelerometer sensor and the gyroscope sensor.

In some embodiments, the control logic is configured to control a moving direction of the electric skateboard, the moving direction comprising a forward moving direction or a backward moving direction.

In some embodiments, the control logic is configured to control a speed of the electric skateboard, the speed comprising an accelerating speed or a decelerating speed.

In some embodiments, the speed of the electric skateboard is controlled in response to a motion of a user associated with the electric skateboard.

In some embodiments, the deformation sensor module includes at least one strain gauge sensor, and wherein the at least one strain gauge sensor senses a pressure placed on the at least one strain gauge sensor.

In some embodiments, the deformation sensor module includes a passive deformation sensor and an active circuitry for deformation sensor signal measurement.

In some embodiments, the passive deformation sensor is printed on a printed circuit board of the deformation sensor module.

An electric skateboard is disclosed according to another embodiment of the present disclosure. In one aspect, the electric skateboard comprises a foot placement section. The electric skateboard comprises a first wheel suspension truck and a second wheel suspension truck, where the first wheel suspension truck and the second wheel suspension truck are spaced apart and substantially parallel to one another, and where the first wheel suspension truck and the second wheel suspension truck are connected to the foot placement section. The electric skateboard comprises a first wheel and a second wheel, where the first wheel and the second wheel are spaced apart and substantially parallel to one another, and where the first wheel and the second wheel are connected to the first wheel suspension truck. The electric skateboard comprises a third wheel and a fourth wheel, where the third wheel and the fourth wheel are spaced apart and substantially parallel to one another, and where the third wheel and the fourth wheel are connected to the second wheel suspension truck. The electric skateboard comprises a first deformation sensor module attached to the first wheel suspension truck, the first deformation sensor module configured to generate a first output signal associated with the electric skateboard. The electric skateboard comprises a second deformation sensor module attached to the second wheel suspension truck, the second deformation sensor module configured to generate a second output signal associated with the electric skateboard. The electric skateboard comprises a control logic configured to output control signals that control a movement of the electric skateboard in response to the first output signal and the second output signal.

In some embodiments, the electric skateboard further comprises an accelerometer sensor and a gyroscope sensor.

In some embodiments, the control logic is configured to output control signals that control the movement of the electric skateboard in response to the first output signal, the second output signal, and output signals of the accelerometer sensor and the gyroscope sensor.

In some embodiments, the control logic is configured to control a moving direction of the electric skateboard, the moving direction comprising a forward moving direction or a backward moving direction.

In some embodiments, the control logic is configured to control a speed of electric skateboard, the speed comprising an accelerating speed or a decelerating speed.

In some embodiments, the speed of the electric skateboard is controlled in response to a motion of a user associated with the electric skateboard.

In some embodiments, the first deformation sensor module, the second deformation sensor module, the third deformation sensor module, or the fourth deformation sensor module includes at least one strain gauge sensor, and wherein the at least one strain gauge sensor senses a pressure placed on the at least one strain gauge sensor.

In some embodiments, the first deformation sensor module, the second deformation sensor module, the third deformation sensor module, or the fourth deformation sensor module comprises a passive deformation sensor and an active circuitry for deformation sensor signal measurement.

In some embodiments, the passive deformation sensor is printed on a printed circuit board of the first deformation sensor module, the second deformation sensor module, the third deformation sensor module, or the fourth deformation sensor module.

In some embodiments, the control logic is configured to output control signals that control the movement of the electric skateboard by comparing the first output signal and the second output signal.

In some embodiments, the control logic is further configured to control a moving direction of the electric skateboard to a forward moving direction when the first output signal is smaller than the second output signal, and wherein the control logic is further configured to control a moving direction of the electric skateboard to a backward moving direction when the first output signal is larger than the second output signal.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIGS. 3A-3C illustrate a front view of the electric skateboard shown in FIG. 1A when the electric skateboard is steered to turn to left or right.

FIG. 6B illustrates a rear view of the electric skateboard shown in FIG. 5A according to one embodiment of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As described above, it may be very inconvenient for the rider to hold the remote control device all the time when riding the electric skateboard. Thus, there is a need for, an electric skateboard which can free up rider's both hands.

Figure 1A:
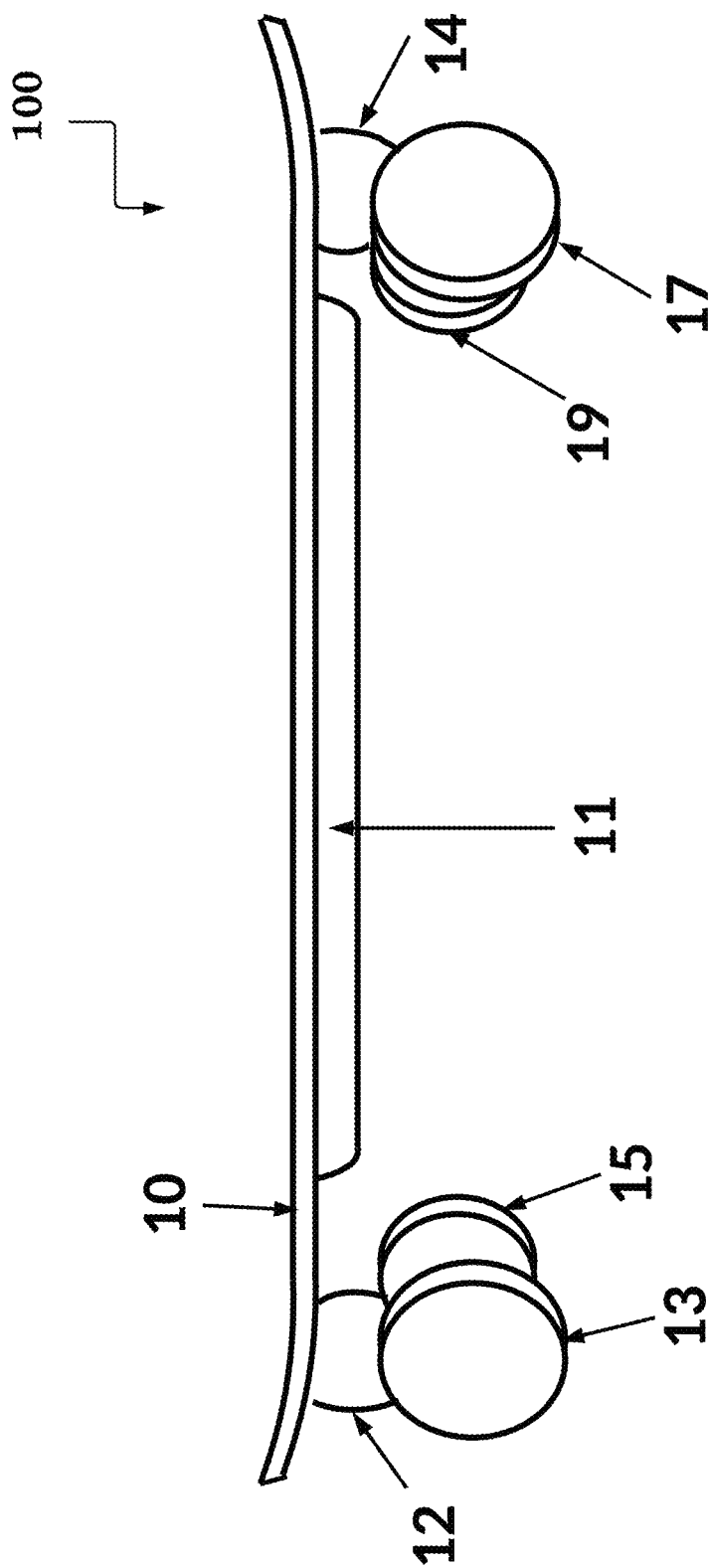
FIG. 1A illustrates a side view of a conventional electric skateboard.
Figure 1B:
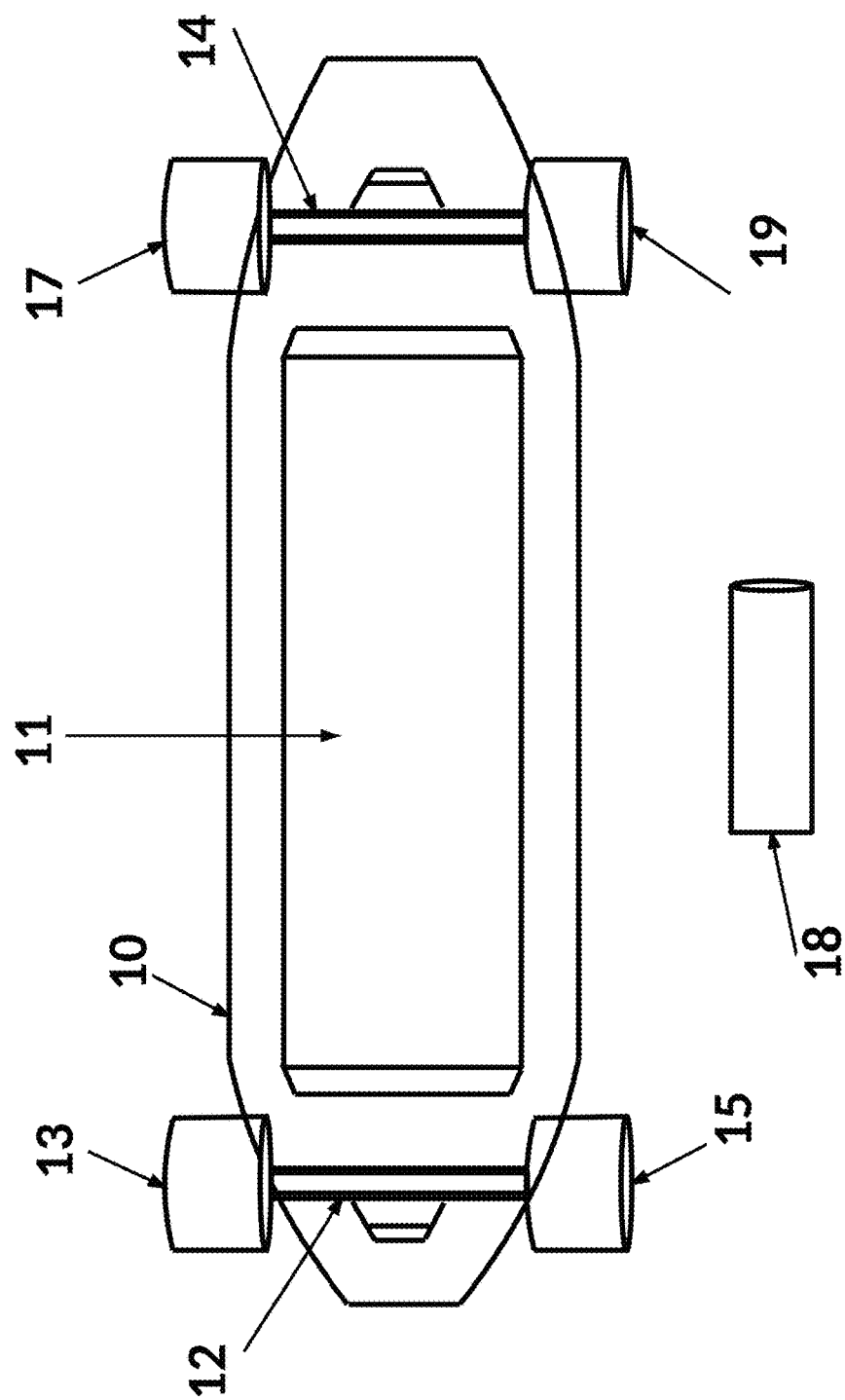
FIG. 1B illustrates a bottom view of the electric skateboard shown in FIG. 1A.
Figure 2A:
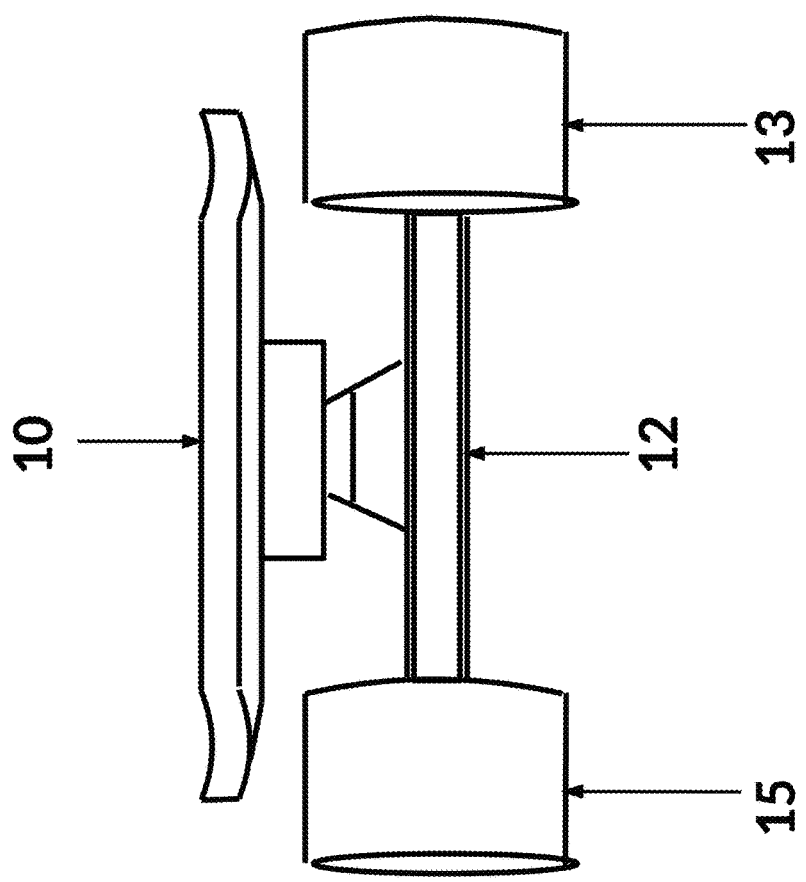
FIG. 2A illustrates a front view of the electric skateboard shown in FIG. 1A.
Figure 2B:
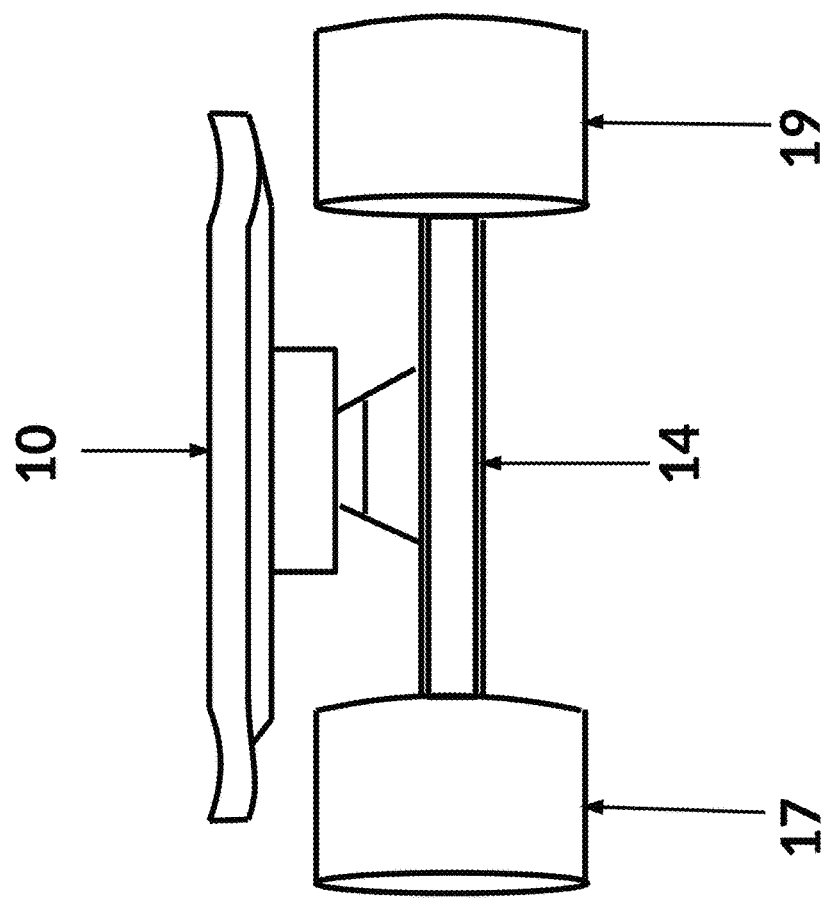
FIG. 2B illustrates a rear view of the electric skateboard shown in FIG. 1A.
Figure 3A:
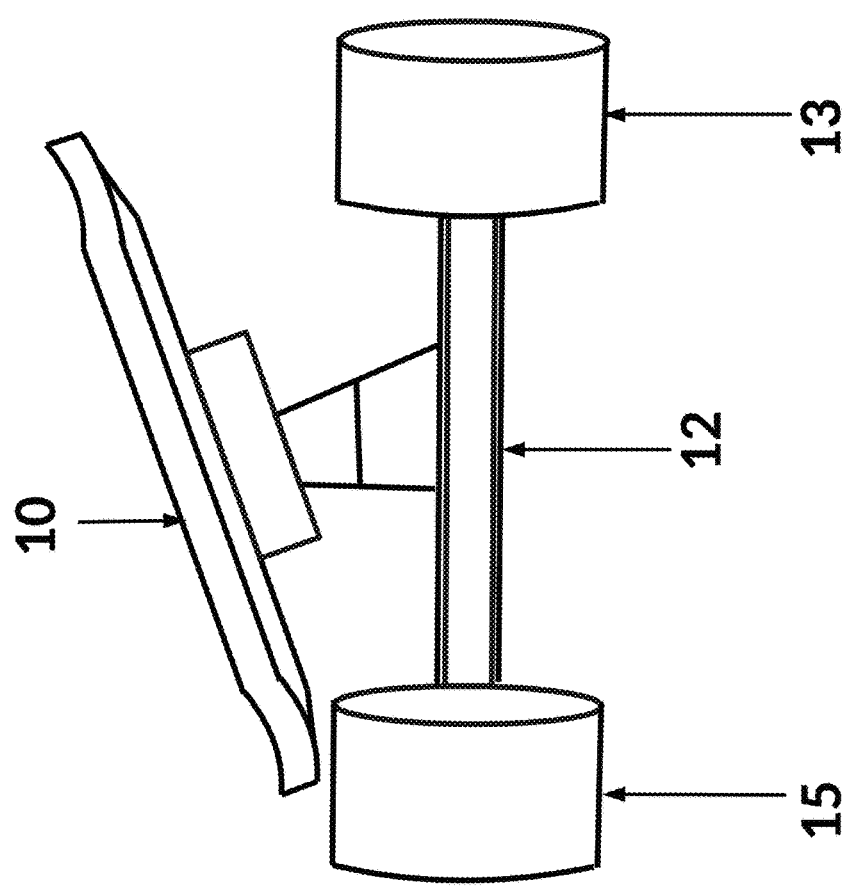
Figure 3B:
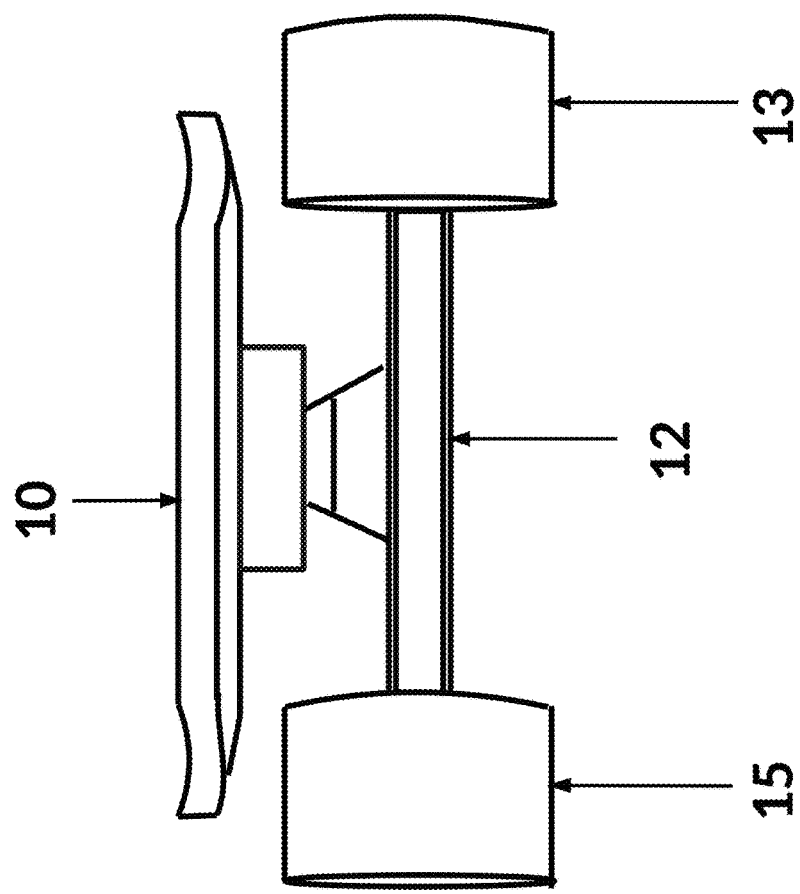
Figure 4:
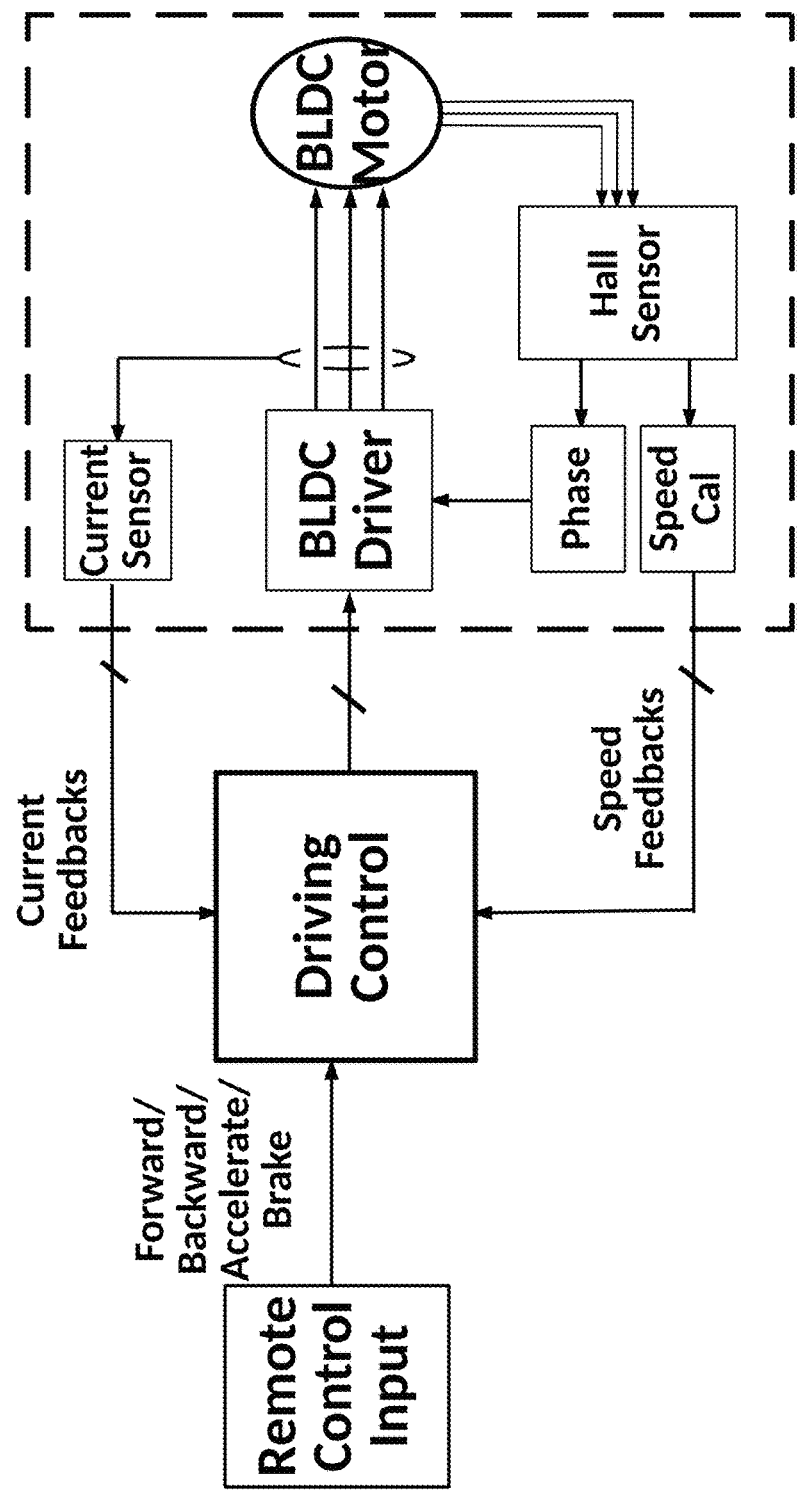
FIG. 4 illustrates one example of a control diagram of the electric skateboard shown in FIG. 1A.
Figure 5A:
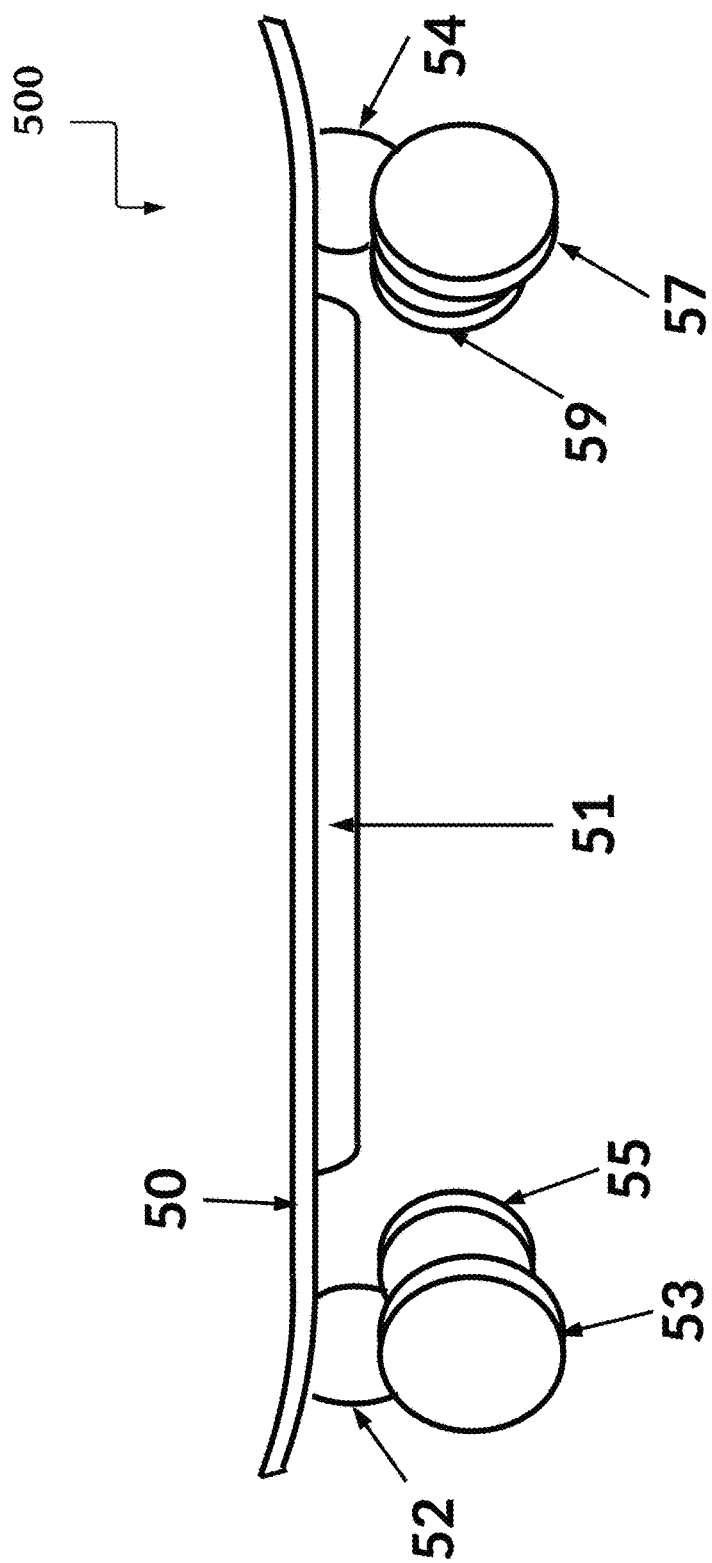
FIG. 5A illustrates a side view of an example electric skateboard with motion assistant gravity control according to one embodiment of the present disclosure.

FIG. 5A illustrates a side view of an example electric skateboard 500 with motion assistant gravity control according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

The electric skateboard 500 with motion assistant gravity control comprises a foot pad 50, a battery and control module 51, a first wheel suspension truck 52, a second wheel suspension truck 54, a first wheel 53, a second wheel 55, a third wheel 57 and a fourth wheel 59.

In some embodiments, the foot pad 50 may be a foot board or platform and include a foot placement section comprising one generally flat plane with room for accommodating two human feet. The foot pad 50 may be attached to one or more wheel suspension trucks, including for example, the first wheel suspension truck 52 and the second wheel suspension truck 54. In some aspects, each wheel suspension truck may include a truck plate, a hanger, a bushing, a kingpin that connects the hanger, bushing, and truck plate together, and an axle housed in the hanger.

In some aspects, the first wheel suspension truck 52 may be a front wheel suspension truck, and the second wheel suspension truck 54 may be a rear wheel suspension truck. Connected to each wheel suspension truck are two wheels. For example, the first wheel 53 and the second wheel 55 are connected to the first wheel suspension truck 52, and the third wheel 57 and the fourth wheel 59 are connected to the second wheel suspension truck 54. In some aspects, the first wheel 53 is a front left wheel, and the second wheel 55 is a front right wheel. The third wheel 57 is a rear left wheel and the fourth wheel 59 is a rear right wheel. In some aspects, one or more of the first wheel 53, the second wheel 55, the third wheel 57 and the fourth wheel 59 may be one or more driving wheels of the electric skateboard 500. In some aspects, a driving wheel of the electric skateboard 500 may include a built-in BLDC motor. In some aspects, a BLDC motor may be located underneath the foot pad 50, and may be configured to drive one or more driving wheels by one or more belts or gears.

In some aspects, the battery and control module 51 may include one or more batteries for the electric skateboard 500 and one or more control modules. The one or more control modules may include one or more sensors and one or more control logics to control the electric skateboard 500 with motion assistant gravity control, which will be further discussed with referenced to FIG. 13.

Figure 5B:
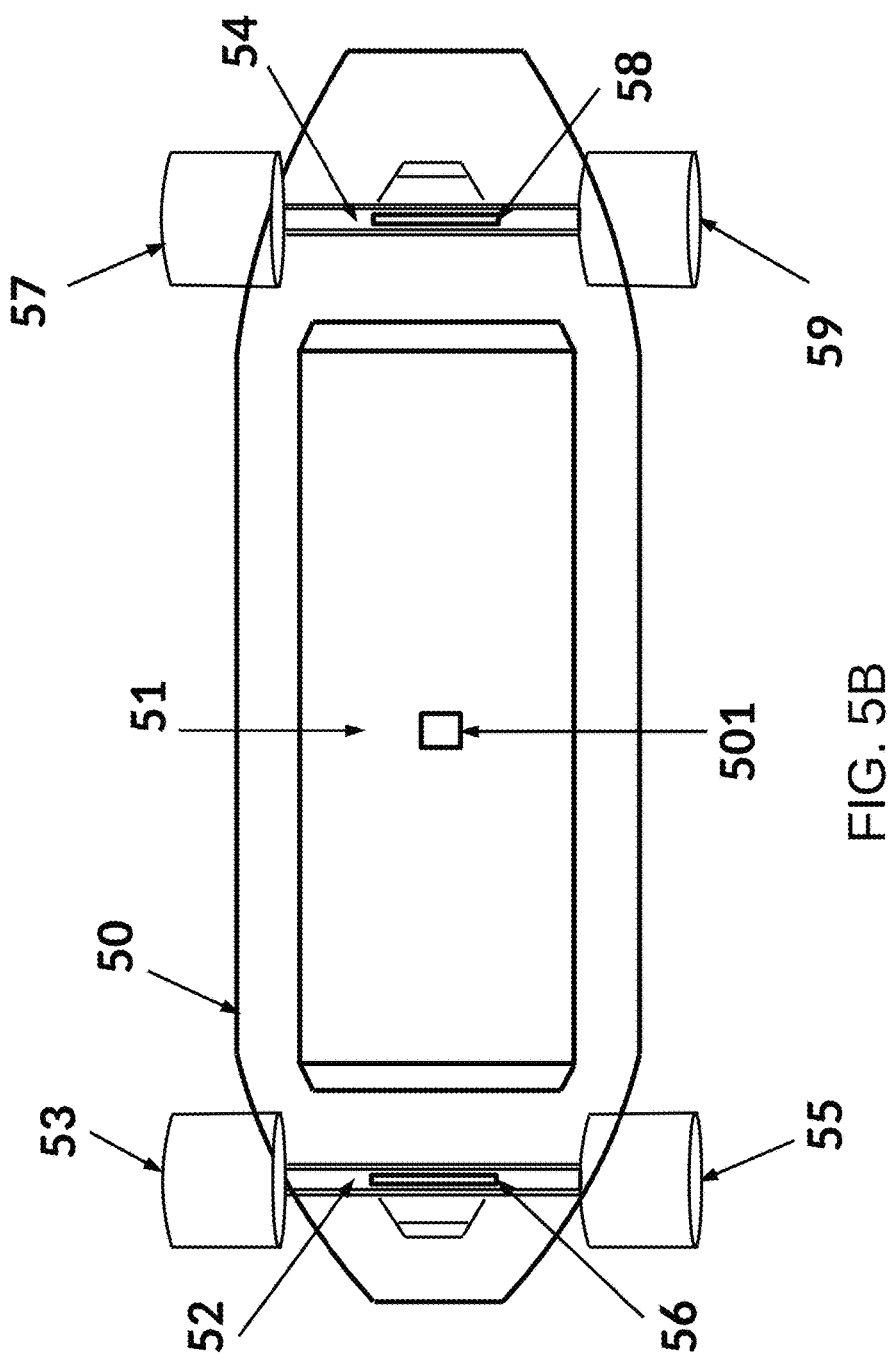
FIG. 5B illustrates a bottom view of the electric skateboard shown in FIG. 5A according to one embodiment of the present disclosure.

FIG. 5B illustrates a bottom view of the electric skateboard 500 shown in FIG. 5A according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 5B, the battery and control module 51 includes a motion sensor 501. The motion sensor 501 may detect one or more motions associated with the electric skateboard 500 and/or a rider of the electric skateboard 500. For example, the motion sensor 501 may detect one or more slopes of the surface that electric skateboard 500 is having contact with. In another example, the motion sensor 501 may detect whether a rider hops on or off the foot pad 50 of the electric skateboard 500.

In some aspects, the motion sensor 501 may include an accelerometer, and/or a gyroscope sensor. In some embodiments, each of the accelerometer and the gyroscope sensor is capable of generating 3-axis outputs in the x, y, and z directions. For example, an accelerometer sensor generates outputs of linear accelerations in the x, y, and z directions, and a gyroscope sensor generates outputs of rotational velocity with respect to the x, y, and z directions. The accelerometer and the gyroscope sensor can be implemented as a microelectromechanical system (MEMS) sensor, such as an integrated MEMS sensor module.

As shown in FIG. 5B, a first deformation sensor module 56 is attached to the first wheel suspension truck 52, and a second deformation sensor module 58 is attached to the second wheel suspension truck 54. In some aspects, the first deformation sensor module 56 may be attached to the first wheel suspension truck 52 by ways of clipping or applying adhesive to the first wheel suspension truck 52 or other method. In some aspects, the second deformation sensor module 58 may be attached to the second wheel suspension truck 54 by ways of clipping or sticking to the second wheel suspension truck 54 or other method.

In some aspects, the first deformation sensor module 56 may be placed at the center or any portion of the first wheel suspension truck 52. In some aspects, the second deformation sensor module 58 may be placed at the center or any portion of the second wheel suspension truck 54.

As shown in FIG. 5B, the first deformation sensor module 56 or the second deformation sensor module 58 is placed at the bottom side of the first wheel suspension truck 52 or the second wheel suspension truck 54. In some aspects, the first deformation sensor module 56 or the second deformation sensor module 58 may be placed at any side of the first wheel suspension truck 52 or the second wheel suspension truck 54.

In some aspects, the first deformation sensor module 56 and/or the second deformation sensor module 58 may include a structure dynamically responding to one or more inputs, including for example, forces and/or pressures applied to the structure. In some aspects, the first deformation sensor module 56 or the second deformation sensor module 58 may include one or more passive deformation sensors such as a weight or gravity detection sensor, including for example, a strain gauge sensor, an extensometer, a load sensor, and/or a piezoelectric sensor.

In some aspects, the first deformation sensor module 56 and/or the second deformation sensor module 58 may include one or more passive deformation sensors and/or one or more active circuitries for sensor signal measurement and post-processing. In some aspects, the passive deformation sensor material may be printed on a printed circuit board (PCB) of a deformation sensor module.

In some aspects, a strain gauge sensor is a sensor whose resistance varies with applied force, and the strain gauge sensor converts input of force, pressure, tension, and/or weight into a change in electrical resistance which can then be measured. When external forces are applied to a structure, strain may be produced as the displacement and deformation that occur.

In some aspects, the strain gauge sensor may be attached to the wheel suspension truck by a suitable adhesive or other method. As the wheel suspension truck is deformed, the sensor foil of the strain gauge sensor is deformed, causing strain gauge sensor's electrical resistance to change. Dependent on the strain gauge sensor's design, the strain gauge sensor's electrical resistance could increase or decrease as the stress on the wheel suspension truck increases.

In some aspects, the weight and/or gravity angle applied to the wheel suspension 52 may be computed by measuring the strain of the wheel suspension truck 52. In some aspects, the weight and/or gravity angle applied to the wheel suspension 54 may be computed by measuring the strain of the wheel suspension truck 54.

Figure 5C:
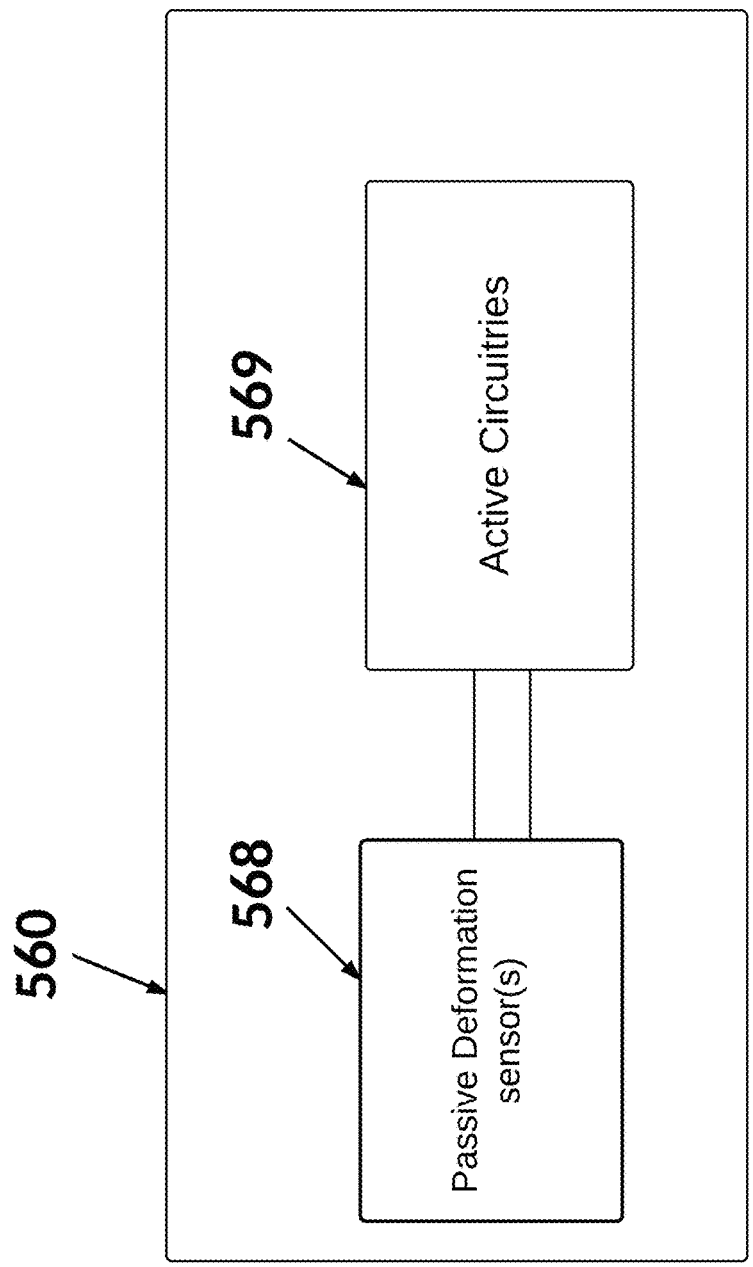
FIG. 5C illustrates a schematic diagram of a deformation sensor module shown in FIG. 5A according to one embodiment of the present disclosure.

FIG. 5C illustrates a schematic diagram of a deformation sensor module shown in FIG. 5A according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 5C, a deformation sensor module 560 includes one or more passive deformation sensors 568 and one or more active circuitries 569 connected with the deformation sensor module 560 for sensor signal measurement and post-processing. The one or more passive deformation sensors 568 may include a deformation sensor or a pair of deformation sensors. The one or more active circuitries 569 for sensor signal measurement and post-processing may include one or more schematic diagrams 900-1200 shown in FIG. 9-FIG. 12, which will be described in details below. In some aspects, the first deformation sensor module 56 or the second deformation sensor module 58 may include the deformation sensor module 560.

Figure 6A:
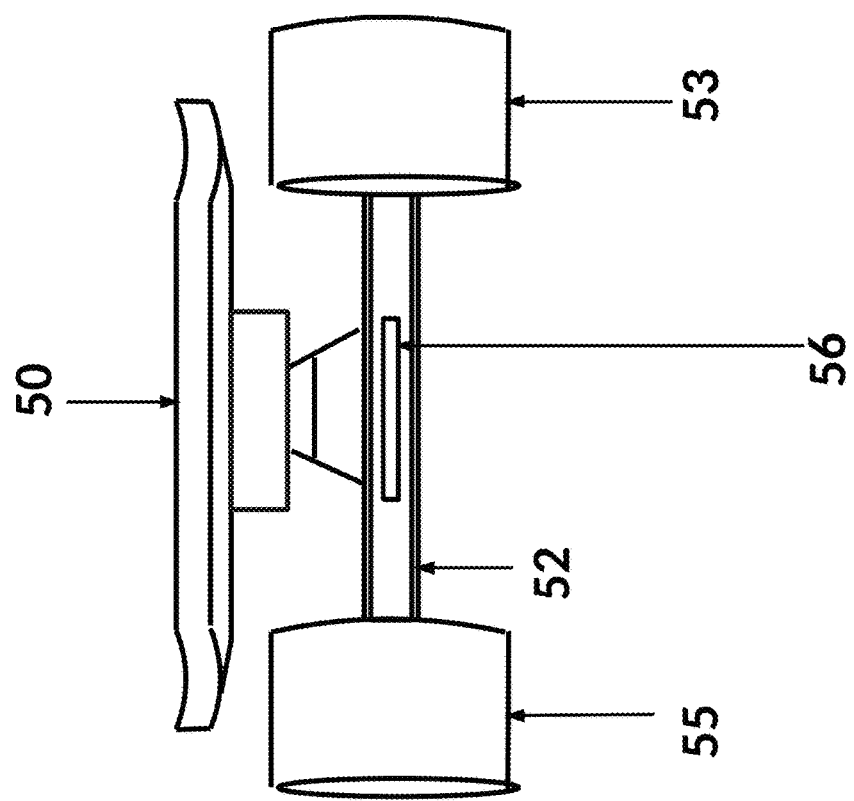
FIG. 6A illustrates a front view of the electric skateboard shown in FIG. 5A according to one embodiment of the present disclosure.

FIG. 6A illustrates a front view of the electric skateboard 500 shown in FIG. 5A according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 6A, the first deformation sensor module 56 is placed on a side portion of the first wheel suspension truck 52. In some aspects, the first deformation sensor module 56 may be placed at any portion of the first wheel suspension truck 52.

FIG. 6B illustrates a rear view of the electric skateboard 500 shown in FIG. 5A according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 6B, the second deformation sensor module 58 is placed on a side portion of the second wheel suspension truck 54. In some aspects, the second deformation sensor module 58 may be placed at any portion of the second wheel suspension truck 54.

Figure 7A:
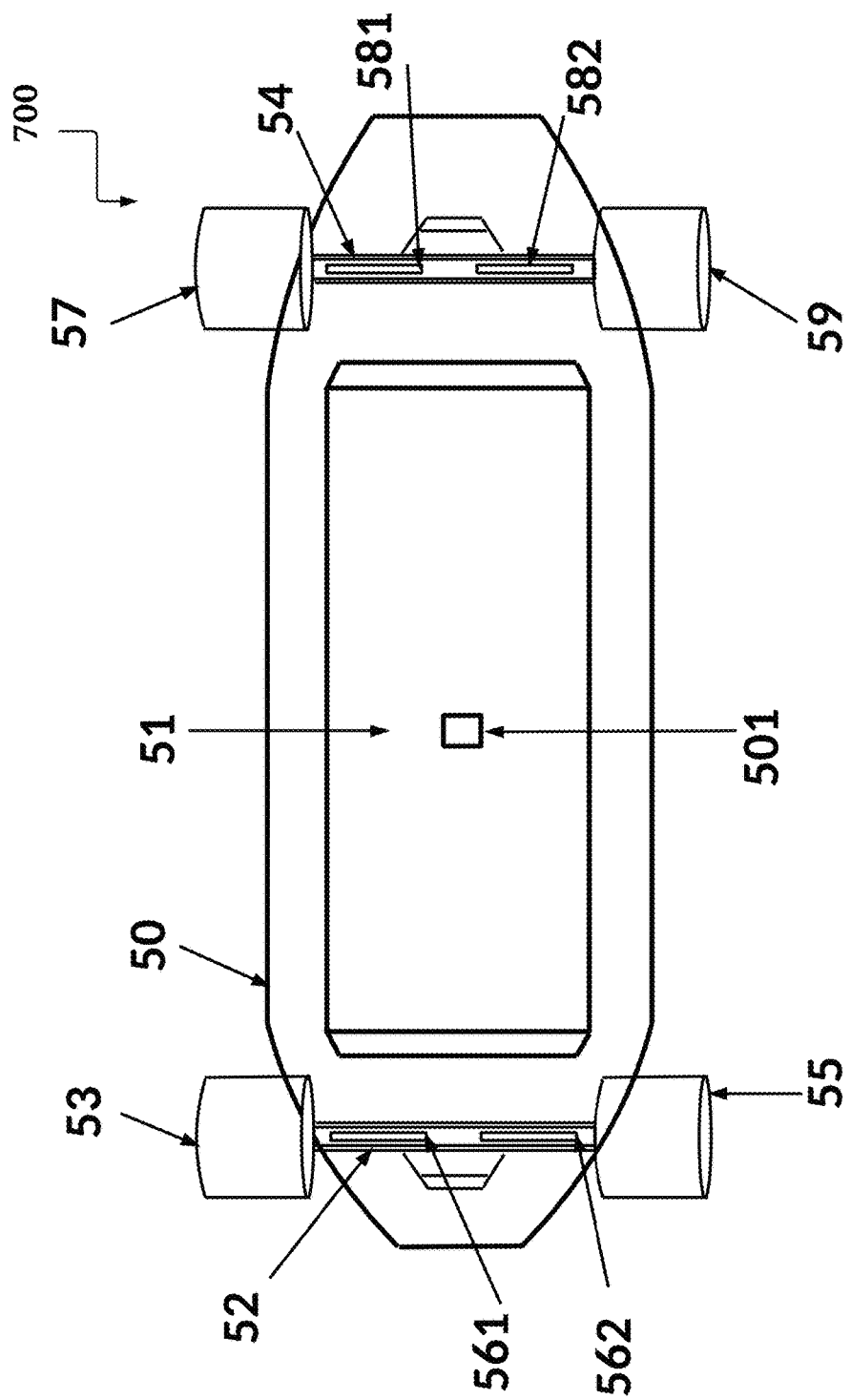
FIG. 7A illustrates a bottom view of an electric skateboard according to another embodiment of the present disclosure.

FIG. 7A illustrates a bottom view of an electric skateboard 700 according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

The electric skateboard 700 with motion assistant gravity control comprises the foot pad 50, the battery and control module 51, the first wheel suspension truck 52, the second wheel suspension truck 54, the first wheel 53, the second wheel 55, the third wheel 57 and the fourth wheel 59, a first deformation sensor module 561, a second deformation sensor module 562, a third deformation sensor module 581 and a fourth deformation sensor module 582.

In some aspects, the first deformation sensor module 561 and the second deformation sensor module 562 may be placed at the center or any portion of the first wheel suspension truck 52. In some aspects, the third deformation sensor module 581 and the fourth deformation sensor module 582 may be placed at the center or any portion of the second wheel suspension truck 54.

In some aspects, each of the first deformation sensor module 561, the second deformation sensor module 562, the third deformation sensor module 581 and the fourth deformation sensor module 582 may include one or more passive deformation sensors and/or one or more active circuitries for sensor signal measurement and post-processing. In some aspects, the passive deformation sensor material may be printed on a printed circuit board (PCB) of a deformation sensor module.

In some aspects, the first deformation sensor module 561 and the second deformation sensor module 562 may be arranged as a first pair of strain gauge sensors attached on the first wheel suspension truck 52, with a predefined distance located in between. In some aspects, the third deformation sensor module 581 and the fourth deformation sensor 582 module may be arranged as a second pair of strain gauge sensors attached on the second wheel suspension truck 54, with a predefined distance located in between.

In some aspects, two strain gauge sensors can be attached on each wheel suspension truck to improve the measurement sensitivity. In some aspects, the number of strain gauge sensors attached on each wheel suspension truck is not limited to two, and can include one, three, four, five or more.

Figure 7B:
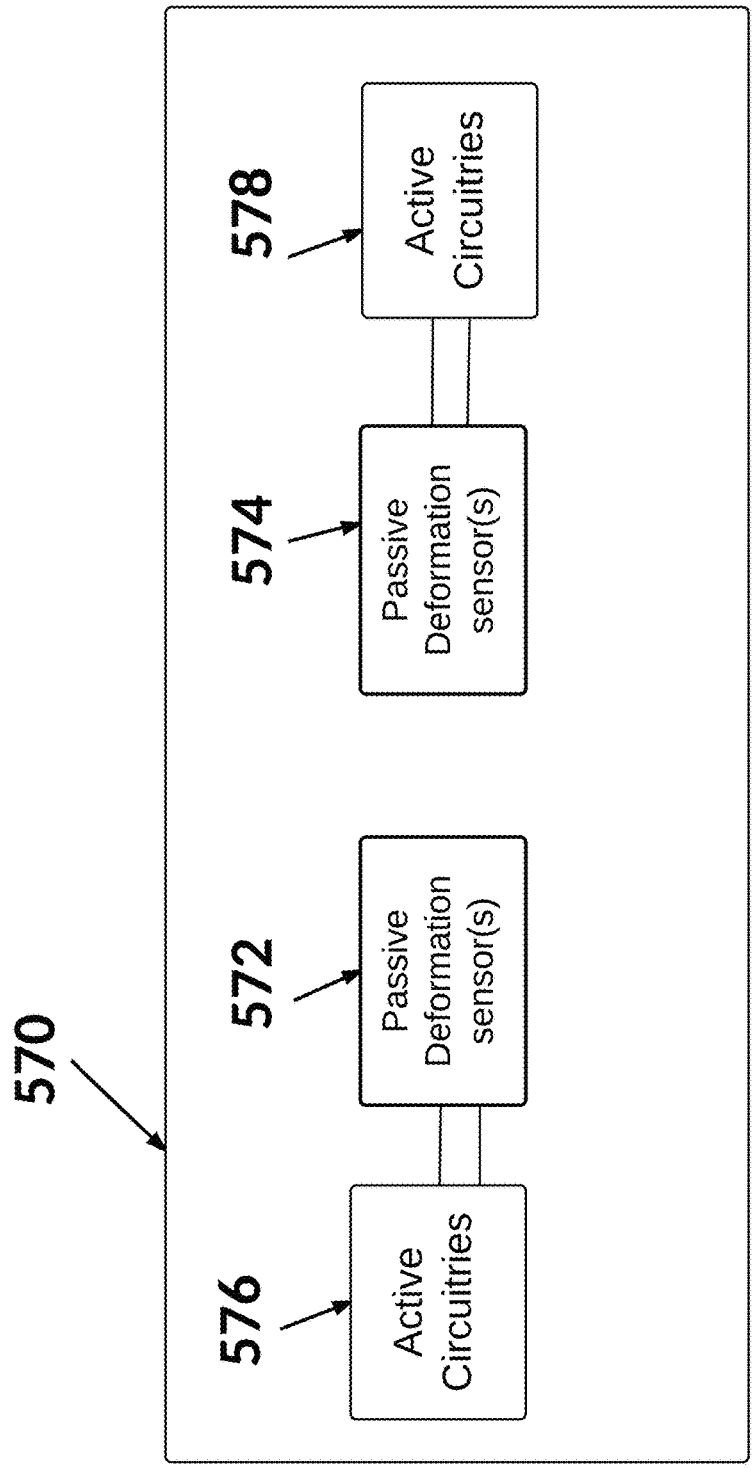
FIG. 7B illustrates a schematic diagram of a deformation sensor module shown in FIG. 7A according to one embodiment of the present disclosure.

FIG. 7B illustrates a schematic diagram of a deformation sensor module shown in FIG. 7A according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 7B, a deformation sensor module 570 includes a first deformation sensor 572, a second deformation sensor 574, a first active circuitry 576 connected with the first deformation sensor 572 and a second active circuitry 578 connected with the second deformation sensor 574. The first deformation sensor 572 and/or the second deformation sensor 574 may include one or more passive deformation sensors. The first active circuitry 576 and/or the second active circuitry 578 may be configured for sensor signal measurement and post-processing and include one or more schematic diagrams 900-1200 shown in FIG. 9-FIG. 12, which will be described in details below. In some aspects, the first deformation sensor module 561, the second deformation sensor module 562, the third deformation sensor module 581 and/or the fourth deformation sensor 582 may include the deformation sensor module 570.

Figure 8A:
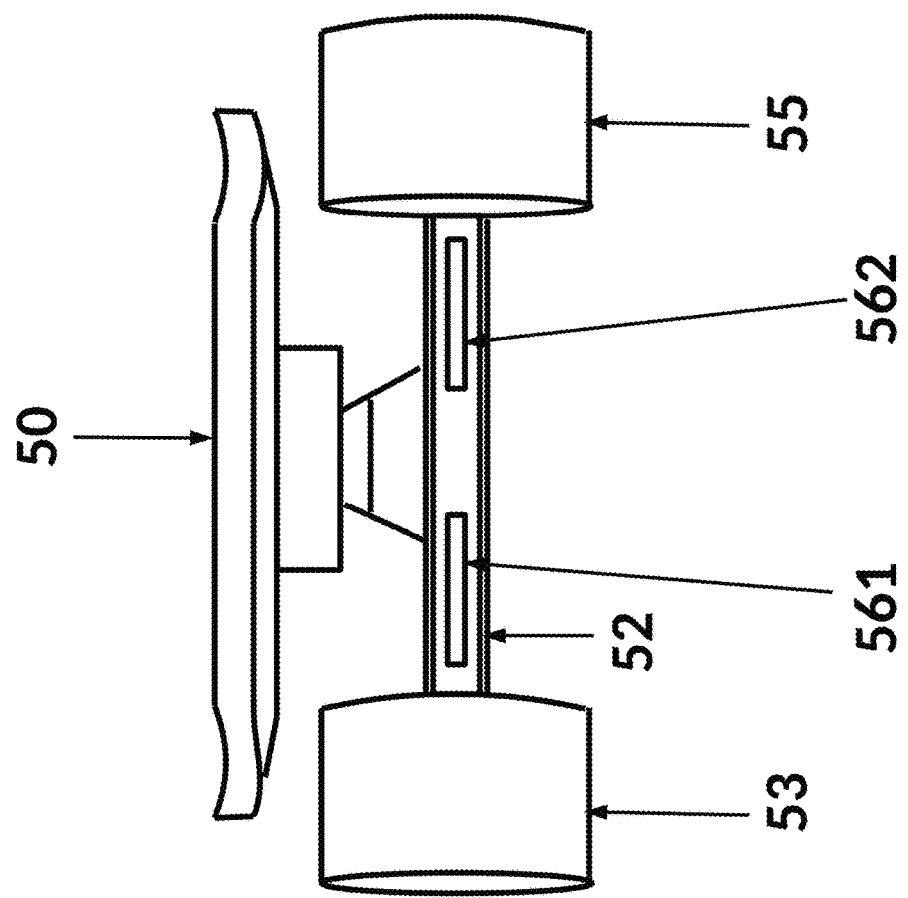
FIG. 8A illustrates a front view of the electric skateboard shown in FIG. 7A according to another embodiment of the present disclosure.

FIG. 8A illustrates a front view of the electric skateboard 700 shown in FIG. 7A according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 8A, the first deformation sensor module 561 and the second deformation sensor module 562 are placed on a side portion of the first wheel suspension truck 52. In some aspects, the first deformation sensor module 561 and the second deformation sensor module 562 may be placed at any portion of the first wheel suspension truck 52.

Figure 8B:
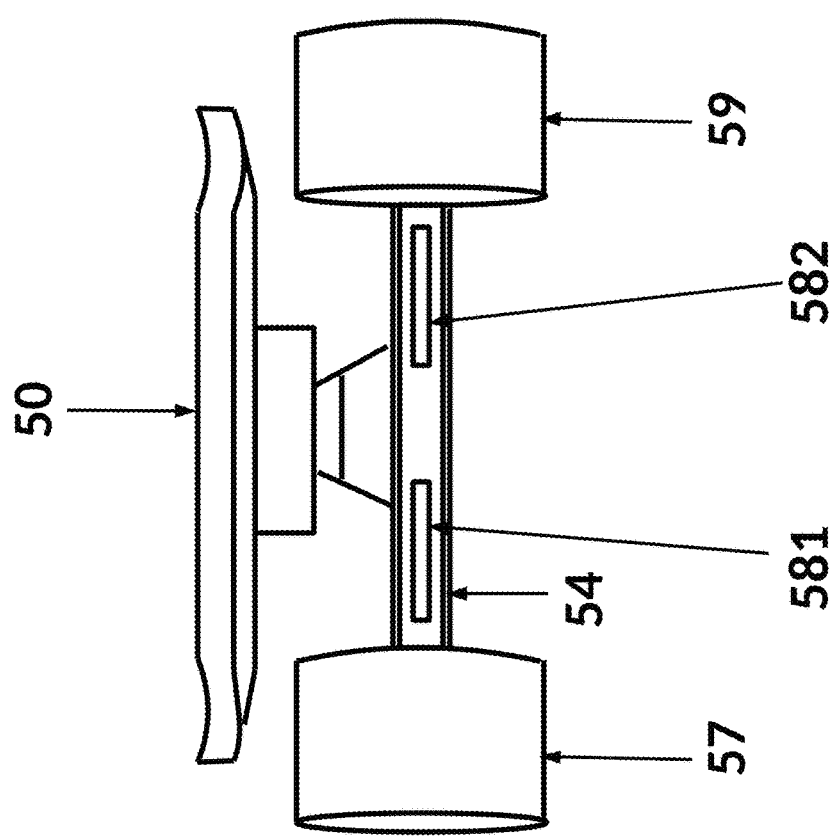
FIG. 8B illustrates a rear view of the electric skateboard shown in FIG. 7A according to another embodiment of the present disclosure.

FIG. 8B illustrates a rear view of the electric skateboard shown 700 in FIG. 7A according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 8B, the third deformation sensor module 581 and the fourth deformation sensor 582 are placed on a side portion of the second wheel suspension truck 54. In some aspects, the third deformation sensor module 581 and the fourth deformation sensor 582 may be placed at any portion of the second wheel suspension truck 54.

Figure 9:
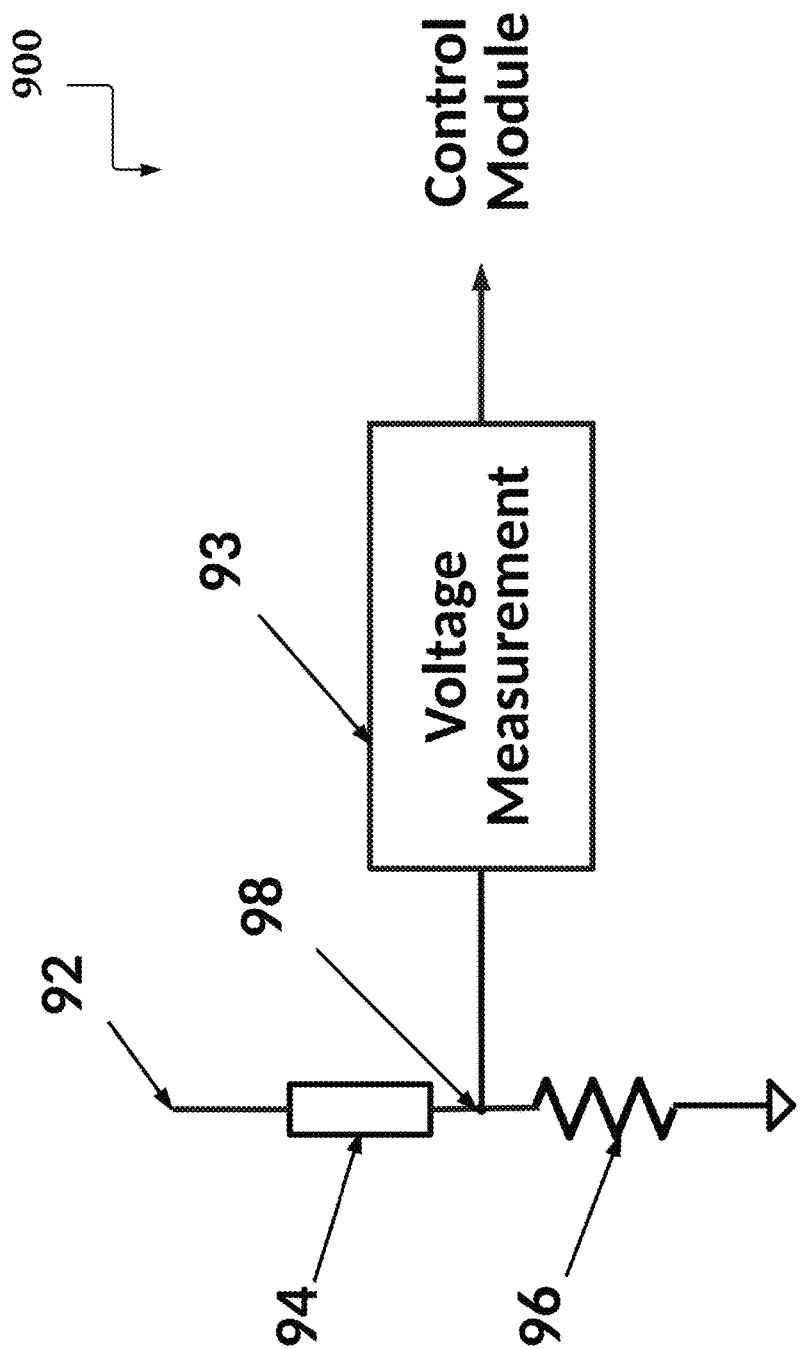
FIG. 9 illustrates a schematic diagram of an exemplary strain gauge sensor signal measurement according to one embodiment of the present disclosure.

FIG. 9 illustrates a schematic diagram 900 of an exemplary strain gauge sensor signal measurement according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 9, schematic diagram 900 includes a Vref 92, a strain gauge sensor 94, a reference resistor 96, Vs 98, and a voltage measurement module 93. In some aspects, Vref 92 may be a low-noise reference voltage. The reference resistor 96 may be a resistor with a fixed resistance value. In some aspects, the schematic diagram 900 may be a half-bridge implementation of an exemplary strain gauge sensor signal measurement.

As described above, a strain gauge sensor is a sensor whose resistance varies with applied force, and the strain gauge sensor converts input of force, pressure, tension, and/or weight into a change in electrical resistance which can then be measured. As the wheel suspension truck is deformed, the sensor foil of the strain gauge sensor is deformed, causing strain gauge sensor's electrical resistance to change. Dependent on the strain gauge sensor's design, the strain gauge sensor's electrical resistance could increase or decrease as the stress on the wheel suspension truck increases.

In some aspects, Vs 98 may be a divided-down sensor output voltage, associated with Vref 92 and the electrical resistance of the strain gauge sensor 94. In one example, Vs 98 may increase when the electrical resistance of the strain gauge sensor 94 decreases. In another example, Vs 98 may decrease when the electrical resistance of the strain gauge sensor 94 increases.

In some aspects, Vs 98 may be measured by the voltage measurement module 93. The voltage measurement module 93 may include an analog-to-digital converter (ADC), and/or a pre-amplifier with signal amplification for further signal post-processing. The output of the voltage measurement module 93 may be sent to one or more control modules, which will be described in details below.

In one example, as described with reference to FIG. 5B, the first deformation sensor module 56 or the second deformation sensor module 58 may include one or more strain gauge sensors. In the present disclosure, the first deformation sensor module 56 or the second deformation sensor module 58 may include the strain gauge sensor 94 and the signal measurement of the deformation sensor module 56 or the second deformation sensor module 58 may be performed in accordance with the schematic diagram 900.

In another example, as described with reference to FIG. 7A-FIG. 7B, any of the first deformation sensor module 561, the second deformation sensor module 562, the third deformation sensor module 581 and the fourth deformation sensor module 582 may include the strain gauge sensor 94 and the signal measurement of any of the first deformation sensor module 561, the second deformation sensor module 562, the third deformation sensor module 581 and the fourth deformation sensor module 582 may be performed in accordance with the schematic diagram 900. Any of the first pair of strain gauge sensors and the second pair of strain gauge sensors may include the strain gauge sensor 94 and the signal measurement of any of the first pair of strain gauge sensors and the second pair of strain gauge sensors may be performed in accordance with the schematic diagram 900.

Figure 10:
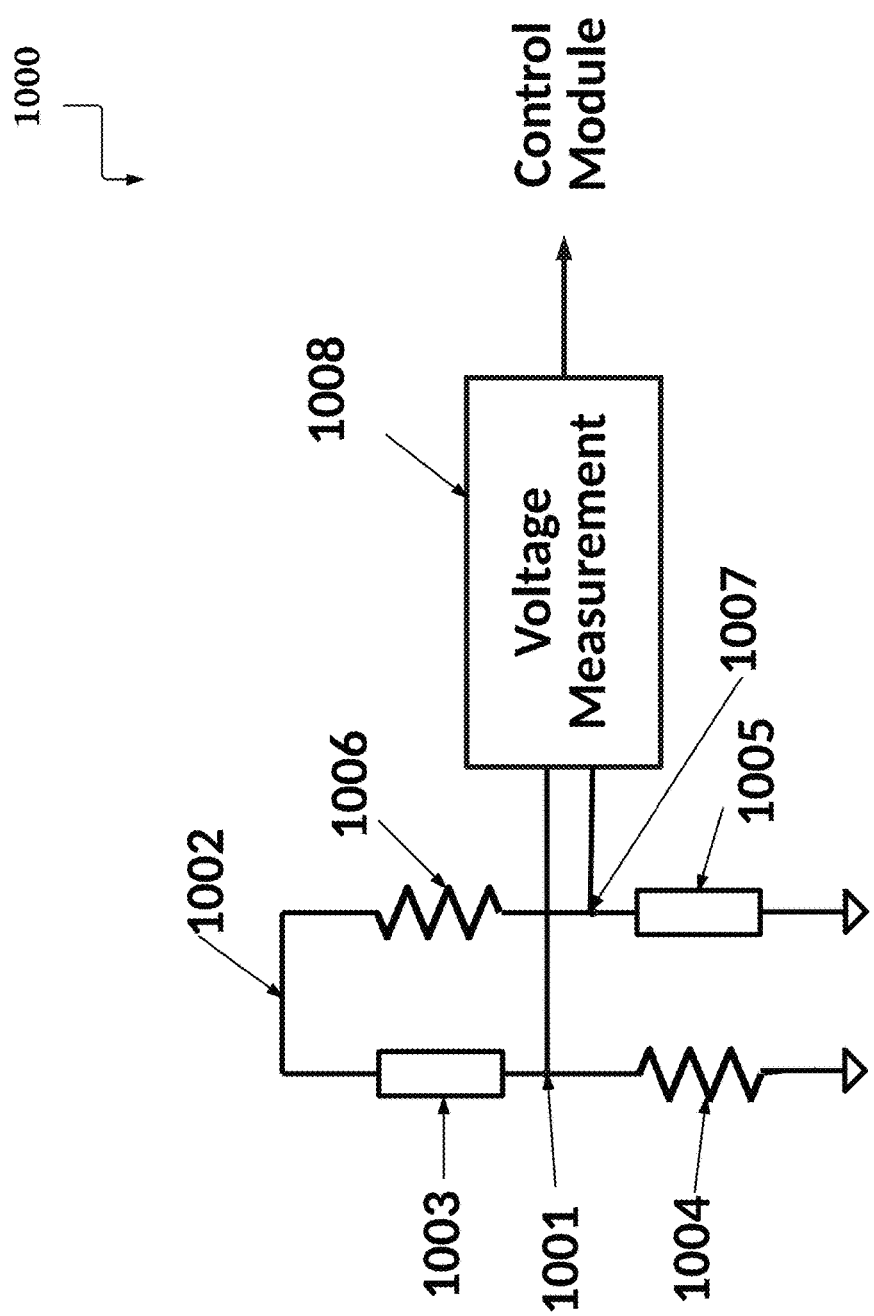
FIG. 10 illustrates a schematic diagram of an exemplary strain gauge sensor signal measurement according to another embodiment of the present disclosure.

FIG. 10 illustrates a schematic diagram 1000 of an exemplary strain gauge sensor signal measurement according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 10, schematic diagram 1000 includes a Vref 1002, a first strain gauge sensor 1003, a second strain gauge sensor 1005, a first reference resistor 1004, a second reference resistor 1006, Vsn 1001, Vsp 1007, and a voltage measurement module 1008. In some aspects, Vref 1002 may be a low-noise reference voltage. Each of the first reference resistor 1004 and the second reference resistor 1006 may be a resistor with a fixed resistance value. In some aspects, schematic diagram 1000 may be a full-bridge implementation of an exemplary strain gauge sensor signal measurement.

In some aspects, Vsn 1001 may be a divided-down sensor output voltage, associated with Vref 1002 and the electrical resistance of the first strain gauge sensor 1003. In one example, Vsn 1001 may increase when the electrical resistance of the first strain gauge sensor 1003 decreases. In another example, Vsn 1001 may decrease when the electrical resistance of the first strain gauge sensor 1003 increases.

In some aspects, Vsp 1007 may be a divided-down sensor output voltage, associated with Vref 1002 and the electrical resistance of the second strain gauge sensor 1005. In one example, Vsp 1007 may increase when the electrical resistance of the second strain gauge sensor 1005 increases. In another example, Vsp 1007 may decrease when the electrical resistance of the second strain gauge sensor 1005 decreases.

In some aspects, the first strain gauge sensor 1003 and the second strain gauge sensor 1005 may be configured to produce voltage Vsn 1001 and Vsp 1007 differentially. The differential output voltage, Vsn 1001 and Vsp 1007 may be measured by the voltage measurement module 1008. The voltage measurement module 1008 may include an analog-to-digital converter (ADC), and/or a pre-amplifier with signal amplification for further signal post-processing. The output of the voltage measurement module 1008 may be sent to one or more control modules, which will be described in details below.

In one example, as described with reference to FIG. 5B, the first deformation sensor module 56 or the second deformation sensor module 58 may include one or more strain gauge sensors. In the present disclosure, the first deformation sensor module 56 or the second deformation sensor module 58 may include the first strain gauge sensor 1003 and the second strain gauge sensor 1005 and the signal measurement of the first deformation sensor module 56 or the second deformation sensor module 58 may be performed in accordance with the schematic diagram 1000.

In another example, as described with reference to FIG. 7A, each of the first deformation sensor module 561, the second deformation sensor module 562, the third deformation sensor module 581, and the fourth deformation sensor module 582 may include one or more strain gauge sensors. In the present disclosure, any of the first deformation sensor module 561, the second deformation sensor module 562, the third deformation sensor module 581 and the fourth deformation sensor module 582 may include the first strain gauge sensor 1003 and the second strain gauge sensor 1005, and the signal measurement of any of the first deformation sensor module 561, the second deformation sensor module 562, the third deformation sensor module 581 and/or the fourth deformation sensor module 582 may be performed in accordance with the schematic diagram 1000. Any of the first pair of strain gauge sensors and the second pair of strain gauge sensors may include the first strain gauge sensor 1003 and the second strain gauge sensor 1005 and the signal measurement of any of the first pair of strain gauge sensors and the second pair of strain gauge sensors may be performed in accordance with the schematic diagram 1000.

Figure 11:
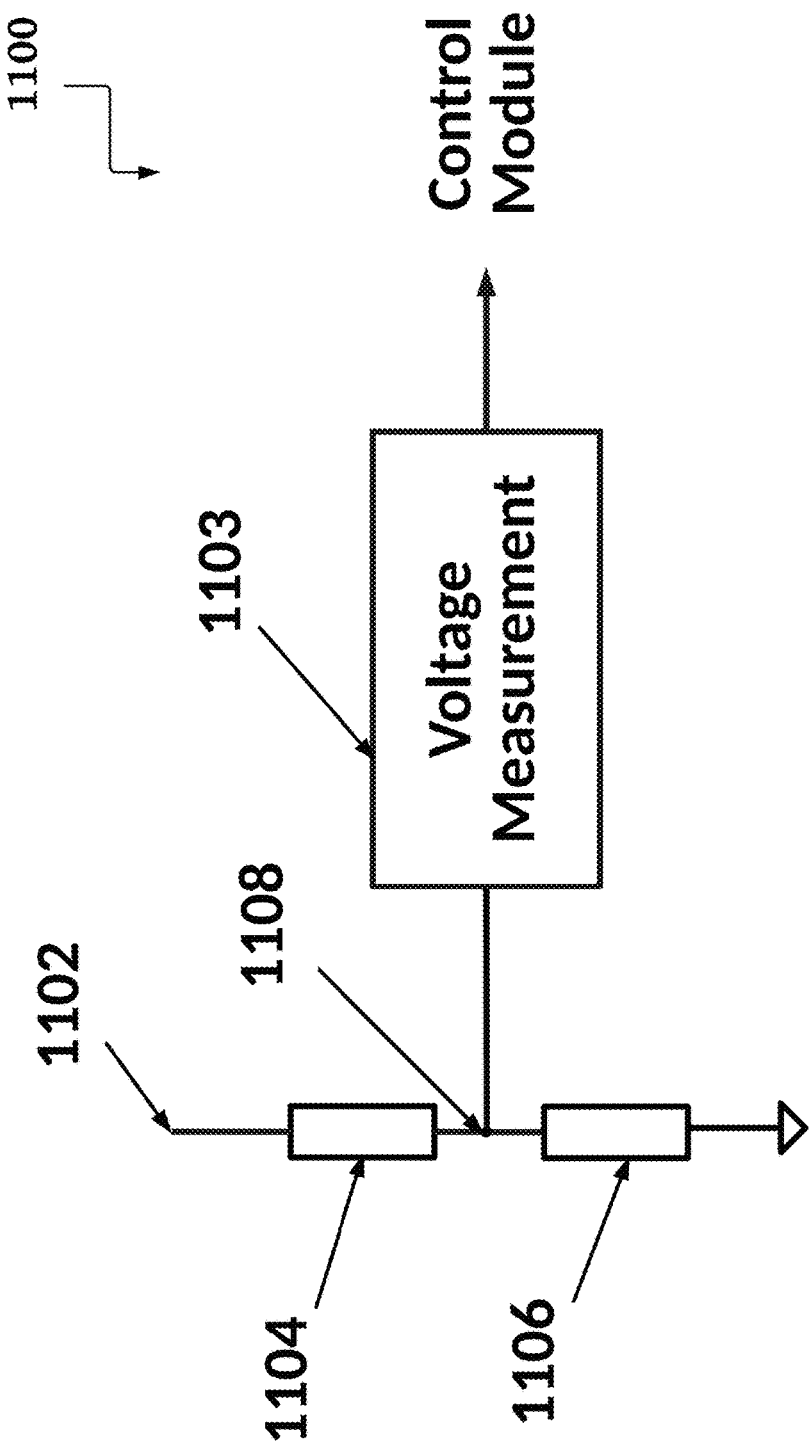
FIG. 11 illustrates a schematic diagram of an exemplary strain gauge sensor signal measurement according to yet another embodiment of the present disclosure.

FIG. 11 illustrates a schematic diagram 1100 of an exemplary strain gauge sensor signal measurement according to yet another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 11, schematic diagram 1100 includes a Vref 1102, a first strain gauge sensor 1104, a second strain gauge sensor 1106, Vs 1108, and a voltage measurement module 1103. In some aspects, Vref 1102 may be a low-noise reference voltage. In some aspects, schematic diagram 1100 may be a half-bridge implementation of an exemplary strain gauge sensor signal measurement.

In some aspects, Vs 1108 may be a divided-down sensor output voltage, associated with Vref 1102, the electrical resistance of the first strain gauge sensor 1104 and the second strain gauge sensor 1106. In one example, Vs 1108 may increase when the electrical resistance of first strain gauge sensor 1104 decreases and/or the electrical resistance of the second strain gauge sensor 1106 increases. In another example, Vs 1108 may decrease when the electrical resistance of first strain gauge sensor 1104 increases and/or the electrical resistance of the second strain gauge sensor 1106 decreases.

As described above, dependent on the strain gauge sensor's design, the strain gauge sensor's electrical resistance could increase or decrease as the applied stress increases. In one example, the electrical resistance of the first strain gauge sensor 1104 may increase as the stress applied increases, and the electrical resistance of the second strain gauge sensor 1106 may decrease as the applied stress increases.

In some aspects, Vs 1108 may be measured by the voltage measurement module 1103. The voltage measurement module 1103 may include an analog-to-digital converter (ADC), and/or a pre-amplifier with potentially signal amplification for further signal post-processing. The output of the voltage measurement module 1103 may be outputted to one or more control modules, which will be described in details below.

In one example, as described with reference to FIG. 5B, the first deformation sensor module 56 or the second deformation sensor module 58 may include one or more strain gauge sensors. In the present disclosure, each of the first deformation sensor module 56 and the second deformation sensor module 58 may include the first strain gauge sensor 1104 and the second strain gauge sensor 1106, and the signal measurement of the first deformation sensor module 56 or the second deformation sensor module 58 may be performed in accordance with the schematic diagram 1100.

In another example, as described with reference to FIG. 7A, each of the first deformation sensor module 561, the second deformation sensor module 562, the third deformation sensor module 581, and the fourth deformation sensor module 582 may include one or more strain gauge sensors. In the present disclosure, any of the first deformation sensor module 561, the second deformation sensor module 562, the third deformation sensor module 581 and the fourth deformation sensor module 582 may include the first strain gauge sensor 1104 and the second strain gauge sensor 1106, and the signal measurement of any of the first deformation sensor module 561, the second deformation sensor module 562, the third deformation sensor module 581 and/or the fourth deformation sensor module 582 may be performed in accordance with the schematic diagram 1100. Any of the first pair of strain gauge sensors and the second pair of strain gauge sensors may include the first strain gauge sensor 1104 and the second strain gauge sensor 1106 and the signal measurement of any of the first pair of strain gauge sensors and the second pair of strain gauge sensors may be performed in accordance with the schematic diagram 1100.

Figure 12:
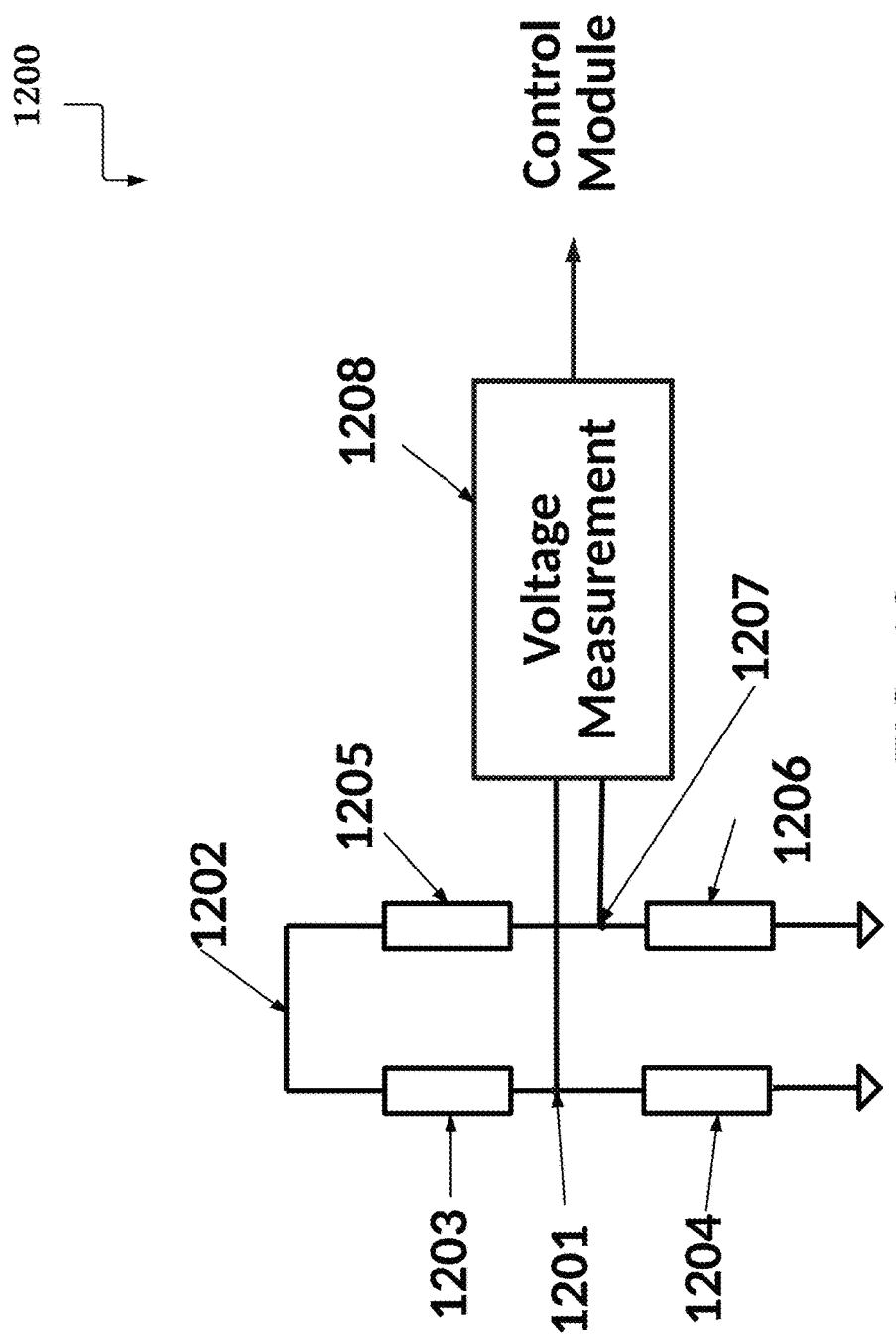
FIG. 12 illustrates a schematic diagram of an exemplary strain gauge sensor signal measurement according to yet another embodiment of the present disclosure.

FIG. 12 illustrates a schematic diagram 1200 of an exemplary strain gauge sensor signal measurement according to yet another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 12, schematic diagram 1200 includes a Vref 1202, a first strain gauge sensor 1203, a second strain gauge sensor 1204, a third strain gauge sensor 1205, a fourth strain gauge sensor 1206, Vsn 1201, Vsp 1207, and a voltage measurement module 1208. In some aspects, Vref 1202 may be a low-noise reference voltage. In some aspects, schematic diagram 1200 may be a full-bridge implementation of an exemplary strain gauge sensor signal measurement.

In some aspects, Vsn 1201 may be a divided-down sensor output voltage, associated with Vref 1202, the electrical resistance of the first strain gauge sensor 1203 and the second strain gauge sensor 1104. In some aspects, Vsp 1207 may be a divided-down sensor output voltage, associated with Vref 1202, the electrical resistance of the third strain gauge sensor 1205 and the fourth strain gauge sensor 1206.

In one example, Vsn 1201 may increase when the electrical resistance of the first strain gauge sensor 1203 decreases and/or the electrical resistance of the second strain gauge sensor 1204 increases. In another example, Vsn 1201 may decrease when the electrical resistance of first strain gauge sensor 1203 increases and/or the electrical resistance of the second strain gauge sensor 1204 decreases.

In another example, Vsn 1207 may increase when the electrical resistance of the third strain gauge sensor 1205 decreases and/or the electrical resistance of the fourth strain gauge sensor 1206 increases. In another example, Vsn 1207 may decrease when the electrical resistance of the third strain gauge sensor 1205 increases and/or the electrical resistance of the fourth strain gauge sensor 1206 decreases.

As described above, dependent on the strain gauge sensor's design, the strain gauge sensor's electrical resistance could increase or decrease as the applied stress increases. In one example, the electrical resistance of the first strain gauge sensor 1204 and the fourth strain gauge sensor 1206 may increase as the applied stress increases, and the electrical resistance of the second strain gauge sensor 1204 and the third strain gauge sensor 1205 may decrease as the applied stress increases.

In some aspects, the first strain gauge sensor 1203, the second strain gauge sensor 1204, the third strain gauge sensor 1205, and the fourth strain gauge sensor 1206 may be configured to produce voltage Vsn 1201 and Vsp 1207 differentially. The differential output voltage, Vsn 1201 and Vsp 1207 may be measured by the voltage measurement module 1208. The voltage measurement module 1208 may include an analog-to-digital converter (ADC), and/or a pre-amplifier with signal amplification for further signal post-processing. The output of the voltage measurement module 1208 may be sent to one or more control modules, which will be described in details below.

In one example, as described with reference to FIG. 5B, the first deformation sensor module 56 or the second deformation sensor module 58 may include one or more strain gauge sensors. In the present disclosure, the first deformation sensor module 56 and/or the second deformation sensor module 58 may include the first strain gauge sensor 1203, the second strain gauge sensor 1204, the third strain gauge sensor 1205, and/or the fourth strain gauge sensor 1206, and the signal measurement of the deformation sensor module 56 or the second deformation sensor module 58 may be performed in accordance with the schematic diagram 1200.

In another example, as described with reference to FIG. 7A, each of the first deformation sensor module 561, the second deformation sensor module 562, the third deformation sensor module 581, and the fourth deformation sensor module 582 may include one or more strain gauge sensors. In the present disclosure, any of the first deformation sensor module 561, the second deformation sensor module 562, the third deformation sensor module 581 and the fourth deformation sensor module 582 may include the first strain gauge sensor 1203, the second strain gauge sensor 1204, the third strain gauge sensor 1205, and/or the fourth strain gauge sensor 1206, and the signal measurement of the first deformation sensor module 561, the second deformation sensor module 562, the third deformation sensor module 581 and/or the fourth deformation sensor module 582 may be performed in accordance with the schematic diagram 1200. Any of the first pair of strain gauge sensors and the second pair of strain gauge sensors may include the first strain gauge sensor 1203, the second strain gauge sensor 1204, the third strain gauge sensor 1205, and/or the fourth strain gauge sensor 1206 and the signal measurement of any of the first pair of strain gauge sensors and the second pair of strain gauge sensors may be performed in accordance with the schematic diagram 1200.

Figure 13:
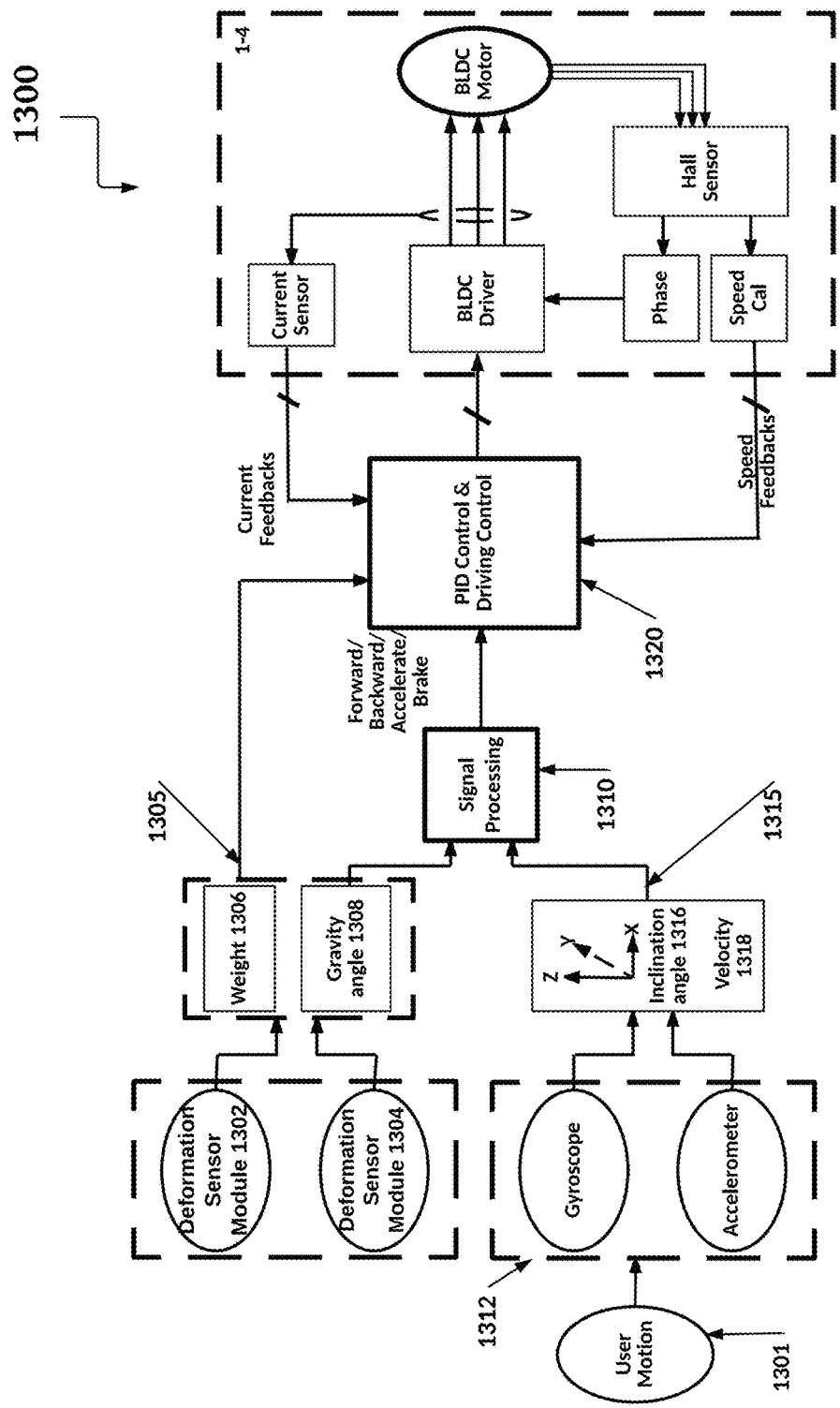
FIG. 13 illustrates a control diagram of an example electric skateboard with motion assistant gravity control according to one embodiment of the present disclosure.

FIG. 13 illustrates a control diagram 1300 of an example electric skateboard with motion assistant gravity control according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

A motion sensor 1312 may include for example, a gyroscope sensor and an accelerometer sensor. The gyroscope sensor and the accelerometer sensor may measure a motion input 1301 of a rider by pushing or shaking the foot pad/board of the example electric skateboard and/or a 3-dimension moving response of the electric skateboard in the x, y, z direction. An output signal 1315 of the motion sensor 1312 may include an inclination angle 1316 and a velocity 1318 associated with the rider and/or the example electric skateboard. In one example, the motion input 1301 may include a predefined motion input, including for example, the rider hopping on and/or off the example electric skateboard.

In one example, a deformation sensor module 1302 or a deformation sensor module 1304 may be or include the first deformation sensor module 56 or the second deformation sensor module 58 as shown in FIG. 5B. In another example, the deformation sensor module 1302 or the deformation sensor module 1304 may be or include the first deformation sensor module 561, the second deformation sensor module 562, the third deformation sensor module 581 and/or the fourth deformation sensor module 582 as shown in FIG. 7A.

A deformation output signal 1305 may be computed by a weight signal 1306 and a gravity angle signal 1308 generated from the deformation sensor module 1302 and/or the deformation sensor module 1304. In one example, as described with reference to FIGS. 9-12, the signal measurement of the deformation sensor module 1302 and/or the deformation sensor module 1304 may be performed in accordance with the schematic diagrams 900, 1000, 1100, and/or 1200.

A PID control and driving control block 1320 may receive one or more move control signals, including for example, forward, backward, accelerate, and/or brake signal from a signal processing unit 1310. The signal processing unit 1310 may combine and process the deformation output signal 1305 and the output signal 1315 of the motion sensor 1312 to produce the one or more move control signals.

In some aspects, the move control signals may control the electric skateboard to move in a direction, including for example, a forward direction or a backward direction. The direction of the electric skateboard's movement may be determined based on the deformation output signal 1305 associated with the weight signal 1306 and the gravity angle signal 1308.

In some aspects, the move control signals may control the speed of the electric skateboard, for example, to accelerate or brake. In one example, the speed of the electric skateboard's movement may be determined based on a user's motion, such as shaking the electric skateboard. In another example, the speed of the electric skateboard's movement may be determined based on the deformation output signal 1305 associated with the weight signal 1306 and the gravity angle signal 1308.

For example, when a rider of an electric skateboard leans his or her body toward a wheel suspension truck, for example, the first wheel suspension truck 52, the first suspension truck 52 may receive a higher pressure compared with the second suspension truck 54. The deformation sensor module 1302 may produce a larger output signal compared with the output signal of the deformation sensor module 1304. After signal correction and compensation from the gyroscope sensor and the accelerometer sensor in the motion sensor 1312 according to the environment, movement and the rider's motion may be acquired and outputted to the PID control and driving control block 1320. The example electric skateboard may move towards wheel suspension truck 1 based on a control signal from the PID control and driving control block 1320. In another example, when the rider leans his or her body toward the second wheel suspension truck 54, the example electric skateboard may move towards the second wheel suspension truck 54 based on a similar mechanism described above.

In some aspects, the example electric skateboard may be steered by the rider by shifting his or her weight to the right or left to complete a right turn or a left turn through the mechanical turn movement of the first and/or second wheel suspension trucks.

Figure 14:
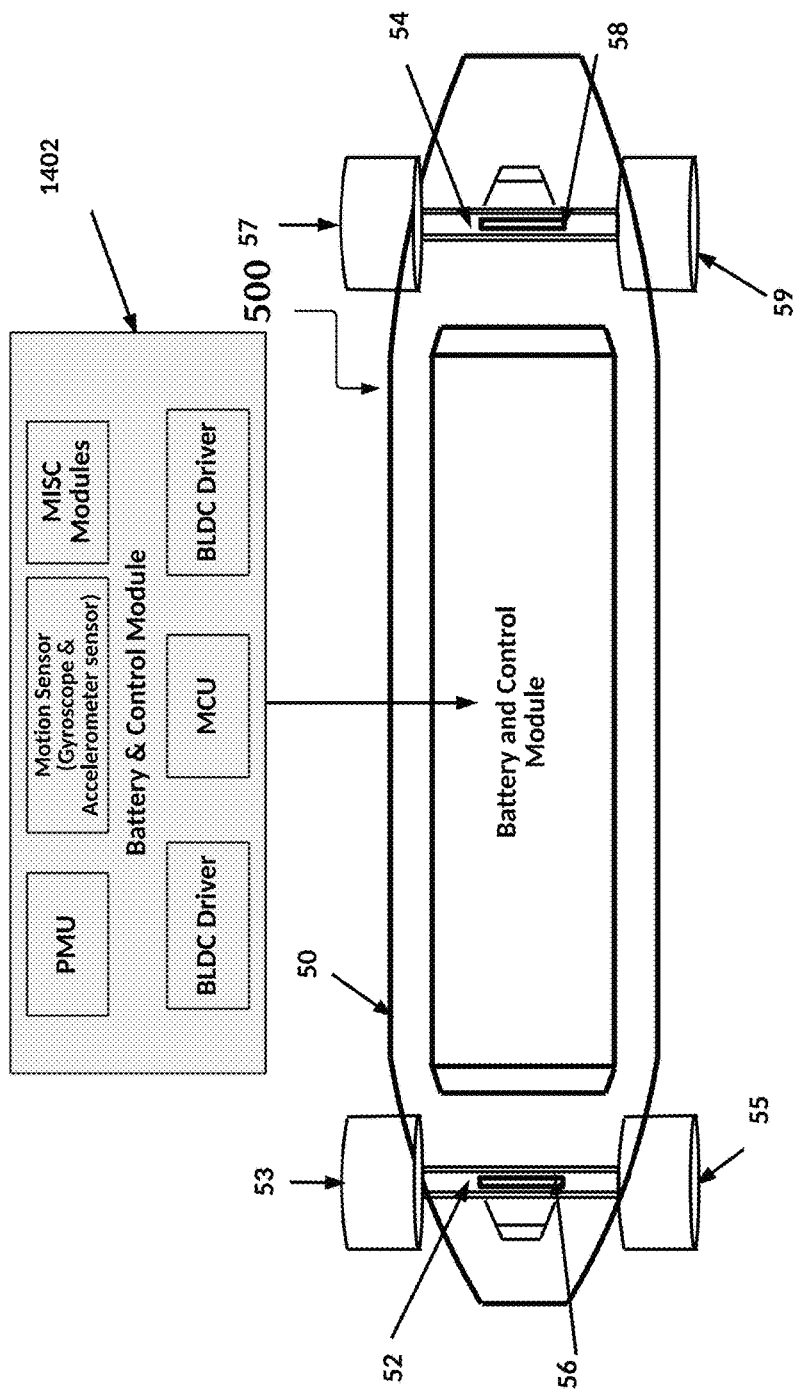
FIG. 14 illustrates an example block diagram of a control module of an example electric skateboard according to one embodiment of the present disclosure.

FIG. 14 illustrates an example block diagram of a control module of an example electric skateboard according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided. Some elements of this figure are described above. Thus, same reference characters identify identical and/or like components described above and any repetitive detailed description thereof will herein after be omitted or simplified in order to avoid complication.

As shown in FIG. 14, a control module 1402 includes a motion sensor, including for example an accelerometer sensor and a gyroscope sensor, a power management unit (PMU), one or more BLDC Drivers, a microcontroller or a central processing unit (MCU), and miscellaneous sub-modules (MISC modules), such as wireless communication modules (e.g., Bluetooth or WIFI communication modules). In some embodiments, each of the accelerometer sensor and the gyroscope sensor is capable of generating 3-axis outputs in the x, y, and z directions and therefore the set of position sensors generates a combined 6-axis positional outputs. For example, an accelerometer sensor generates outputs of linear accelerations in the x, y, and z directions, and a gyroscope sensor generates outputs of rotational velocity with respect to the x, y, and z directions. The accelerometer sensor and the gyroscope sensor can be implemented as a microelectromechanical system (MEMS) sensor, such as an integrated MEMS sensor module.

In some aspects, the control module 1402 may be the battery and control module 51, and the example electric skateboard may include the example electric skateboard 500 as described with reference to FIG. 5A, FIG. 5B, FIG. 6A and FIG. 6B.

In some aspects, the control module 1402 may be the battery and control module 51, and the example electric skateboard may include the example electric skateboard 700 as described with reference to FIG. 7A, FIG. 8A and FIG. 8B.

In some embodiments, additional types of sensors may be placed in the control module 1402 to provide additional sensing or control information. For example, sensors that detect outside temperature, body temperature, humidity, and/or other information may be installed. In addition, cameras or camera mounts may be installed in order to detect the surrounding environments or for sensing impending changes. In some embodiments, additional torque sensors may be installed to calculate the torque and send the signal to the on-board processors. In some embodiments, other equipment, such as GPS signal receivers, music players, pockets or slots for storage, and so forth, may be added.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. An electric skateboard comprising:
a foot placement section;
a wheel suspension truck connected to the foot placement section;
a first wheel and a second wheel, wherein the first wheel and the second wheel are spaced apart and substantially parallel to one another and wherein the first wheel and the second wheel are connected to the wheel suspension truck;
a deformation sensor module attached to the wheel suspension truck, the deformation sensor module configured to generate a weight signal and a gravity angle signal associated with the electric skateboard;
a battery and control module including an accelerometer sensor, a gyroscope sensor, a power management unit (PMU), one or more BLDC drivers, a microcontroller or a central processing unit (MCU), wherein each of the accelerometer sensor and the gyroscope sensor generates 3-axis outputs in x, y and z directions; the accelerometer sensor and the gyroscope sensor generate combined 6-axis positional outputs; the accelerometer sensor generates outputs of linear accelerations in the x, y and z directions; and the gyroscope sensor generates outputs of rotational velocity with respect to the x, y and z directions; and the battery and control module configured to output control signals that control a movement of the electric skateboard in response to the weight signals, and the gravity angle signals;
wherein the deformation sensor module includes a first deformation sensor, a second deformation sensor, a first active circuitry connected with the first deformation sensor and a second active circuitry connected with the second deformation sensor; the first deformation sensor and the second deformation sensor include one or more passive deformation sensors printed on a printed circuit board of the deformation sensor module; and the first active circuitry and the second active circuitry are configured for sensor signal measurement and post-processing and include one or more schematic diagrams;
wherein each of the one or more schematic diagrams comprises at least one strain gauge sensor and a voltage measurement module, and the at least one strain gauge sensor and the voltage measurement module are in sequential connections with the battery and control module; and
wherein the accelerometer sensor, the gyroscope sensor, and the deformation sensor module are in parallel connections with each other to be coupled to a signal processing unit.

2. The electric skateboard of claim 1, wherein the battery and control module is configured to output control signals that control the movement of the electric skateboard in response to the weight signals, the gravity angle signals, and output signals of the accelerometer sensor and the gyroscope sensor.

3. The electric skateboard of claim 1, wherein the battery and control module is configured to control a moving direction of the electric skateboard, the moving direction comprising a forward moving direction or a backward moving direction.

4. The electric skateboard of claim 1, wherein the battery and control module is configured to control a speed of the electric skateboard, the speed comprising an accelerating speed or a decelerating speed.

5. The electric skateboard of claim 4, wherein the speed of the electric skateboard is controlled in response to a motion of a user associated with the electric skateboard.

6. The electric skateboard of claim 1, wherein the at least one strain gauge sensor senses a pressure placed on the at least one strain gauge sensor.

7. An electric skateboard comprising:
a foot placement section;
a first wheel suspension truck and a second wheel suspension truck, wherein the first wheel suspension truck and the second wheel suspension truck are spaced apart and substantially parallel to one another, and wherein the first wheel suspension truck and the second wheel suspension truck are connected to the foot placement section;
a first wheel and a second wheel, wherein the first wheel and the second wheel are spaced apart and substantially parallel to one another, and wherein the first wheel and the second wheel are connected to the first wheel suspension truck;
a third wheel and a fourth wheel, wherein the third wheel and the fourth wheel are spaced apart and substantially parallel to one another, and wherein the third wheel and the fourth wheel are connected to the second wheel suspension truck;
a first deformation sensor module attached to the first wheel suspension truck, the first deformation sensor module configured to generate a first output signal associated with the electric skateboard;
a second deformation sensor module attached to the second wheel suspension truck, the second deformation sensor module configured to generate a second output signal associated with the electric skateboard;
a battery and control module including an accelerometer sensor, a gyroscope sensor, a power management unit (PMU), one or more BLDC drivers, a microcontroller or a central processing unit (MCU), wherein each of the accelerometer sensor and the gyroscope sensor generates 3-axis outputs in x, y, and z directions; the accelerometer sensor and the gyroscope sensor generate combined 6-axis positional outputs; the accelerometer sensor generates outputs of linear accelerations in the x, y, and z directions; and the gyroscope sensor generates outputs of rotational velocity with respect to the x, y, and z directions; and the battery and control module configured to output control signals that control a movement of the electric skateboard in response to the first output signal and the second output signal,
wherein the first deformation sensor module and the second deformation sensor module include a first pair of strain gauge sensors and a second pair of strain gauge sensors, respectively; and
the first pair of strain gauge sensors and the second pair of strain gauges sensors are coupled to a voltage measurement module and the battery and control module sequentially; and
wherein the accelerometer sensor, the gyroscope sensor, and the first deformation sensor module and the second deformation sensor module are in parallel connections with each other to be coupled to a signal processing unit.

8. The electric skateboard of claim 7, wherein the battery and control module is configured to output control signals that control the movement of the electric skateboard in response to the first output signal, the second output signal, and output signals of the accelerometer sensor and the gyroscope sensor.

9. The electric skateboard of claim 7, wherein the battery and control module is configured to control a moving direction of the electric skateboard, the moving direction comprising a forward moving direction or a backward moving direction.

10. The electric skateboard of claim 7, wherein the battery and control module is configured to control a speed of electric skateboard, the speed comprising an accelerating speed or a decelerating speed.

11. The electric skateboard of claim 10, wherein the speed of the electric skateboard is controlled in response to a motion of a user associated with the electric skateboard.

12. The electric skateboard of claim 7, wherein the electric skateboard further comprises a third deformation sensor module, and a fourth deformation sensor module; and each of the third deformations sensor module and the fourth deformations sensor module includes a strain gauge sensor, and wherein the at least one strain gauge sensor senses a pressure placed on the strain gauge sensor.

13. The electric skateboard of claim 7, wherein the third deformation sensor module, or the fourth deformation sensor module comprises a passive deformation sensor and an active circuitry for deformation sensor signal measurement.

14. The electric skateboard of claim 13, wherein the passive deformation sensor is printed on a printed circuit board of the third deformation sensor module, or the fourth deformation sensor module.

15. The electric skateboard of claim 7, wherein the battery and control module is configured to output control signals that control the movement of the electric skateboard by comparing the first output signal and the second output signal.

16. The electric skateboard of claim 9, wherein the battery and control module is further configured to control a moving direction of the electric skateboard to a forward moving direction when the first output signal is smaller than the second output signal, and wherein the battery and control module is further configured to control a moving direction of the electric skateboard to a backward moving direction when the first output signal is larger than the second output signal.

* * * * *